United States Patent [19]

Soga et al.

[11] Patent Number: 5,376,964
[45] Date of Patent: Dec. 27, 1994

[54] VIDEO CAMERA, METHOD OF PHOTOMETRY THEREIN, AND METHOD OF FOCUSING SAME

[75] Inventors: Takashi Soga; Kiyotaka Kaneko; Minoru Arai; Shigekazu Fukada, all of Asaka, Japan

[73] Assignee: Fuji Photo Film Co., Ltd., Kanagawa, Japan

[21] Appl. No.: 91,754

[22] Filed: Jul. 14, 1993

[30] Foreign Application Priority Data

Jul. 14, 1992 [JP] Japan ................. 4-208546
Jul. 28, 1992 [JP] Japan ................. 4-219542
Jul. 28, 1982 [JP] Japan ................. 4-219543

[51] Int. Cl.⁵ .................................. H04N 5/232
[52] U.S. Cl. .................................. 348/229; 348/362
[58] Field of Search .......... 358/41, 43, 44, 227, 358/515, 520, 39; 354/402; H04N 5/232; 348/221, 229, 234, 235, 236, 238, 345, 348, 354, 355, 362, 364, 264

[56] References Cited

U.S. PATENT DOCUMENTS 4,614,974  9/1986  Toyama ................. 358/227
5,049,983  9/1991  Matsumoto et al. ........ 358/44
5,077,613  12/1991 Hirao et al. ............ 358/227
5,185,658  2/1993  Shinomiya ............... 358/44
5,200,828  4/1993  Jang et al. .

FOREIGN PATENT DOCUMENTS 0553850  8/1993  European Pat. Off. .
4137874  5/1992  Japan .

Primary Examiner—Richard Hjerpe
Assistant Examiner—Kim Yen Vu

[57] ABSTRACT

A video signal, which is obtained from a solid-state electronic image sensing device, is used to obtain a photometric value corresponding to the environment in which a subject is present. Photometric areas that differ for every field in one frame are set within a photographic area of a CCD. A luminance-signal component extracted from the video signal by a $Y_L$ synthesizing circuit is integrated by an integrating circuit, under the control of a CPU, with respect to a horizontal scanning interval and vertical scanning interval corresponding to the photometric area. Obtained integrated values are added field by field and a photometric value is calculated field by field from the value resulting from adding the integrated values.

22 Claims, 24 Drawing Sheets

Fig.23

| DRIVE (μm) OF IMAGE PICK-UP LENS | ADDED DATA |
|---|---|
| 0 | |
| 10 | |
| 20 | |
| 30 | |
| 40 | |
| 50 | |

VIDEO CAMERA, METHOD OF PHOTOMETRY THEREIN, AND METHOD OF FOCUSING SAME

BACKGROUND OF THE INVENTION

1. Field of the Invention

This invention relates to a video camera (which includes a still/movie-video camera and a still-video camera) in which photometry of a subject is performed and exposure conditions are determined, using a video signal obtained from a solid-state electronic image sensing device, as well as a method of photometry used in the video camera.

The invention further relates to a video camera (which includes a still/movie-video camera and a still-video camera) in which automatic focusing control is performed using a video signal obtained by preparatory imaging of an incident light image using a solid-state electronic image sensing device, as well as a method of focusing used in the video camera.

The invention further relates to a video camera (which includes a still/movie-video camera and a still-video camera) in which photometry and control of automatic focusing is performed using a video signal obtained by preparatory imaging of the image of a subject using a solid-state electronic image sensing device, as well as a method of photometry and focusing used in the video camera.

2. Description of the Background Art

Photometry is required in order to determine exposure conditions in a camera having an automatic exposure (so-called "AE") function. Photometry can be performed in a variety of ways. One method is to dispose a photometric element on the front side of the camera. Though this method is a simple one, an intrinsic problem which arises is that the area in which light measured does not coincide with the area photographed. This problem becomes particularly pronounced in a case where the field of view is changed using a zoom lens. In order to solve this problem, it is necessary to change the photometric area of the photometric element in operative association with the zoom lens of the photographic system. This necessitates an elaborate mechanism.

Another method (referred to as "TTL photometry") that is available involves incorporating the photometric element in the image pick-up optical system and making the photometric area coincide with the photographic area. With this method, the image pick-up optical system requires such devices as a beam splitter and elements for deflecting the optical path. This leads to a larger optical system and to a decline in sensitivity caused by a decline in the transmittance of light. There is another problem in durability and reliability in a case where a mirror is used.

Accordingly, in the case of a video camera having a solid-state electronic image sensing device (such as a CCD) in which a video signal representing the image of a subject is obtained, consideration may be given to a method in which a photometric value is found by integrating the video signal, which is produced by the solid-state electronic image sensing device, over an appropriate photometric area. This approach is advantageous in that the photographic area and photometric area coincide completely, there is no increase in size and it is unnecessary to provide extra elements for the optical system. In addition, such variations as average photometry, partial photometry and split photometry become possible by electrically processing the video signal obtained from the solid-state electronic image sensing device. Since this makes it possible to set exposure conditions corresponding to a variety of photographic environments, a broader range of applications is achieved.

Video cameras further have various automatic focusing functions (so-called "AF" functions). These include a function in which an incident light image is preliminarily captured by a solid-state electronic image sensing device such as a CCD and focusing control is performed using the video signal obtained by this imaging operation.

However, in a video camera which performs focusing control using the video signal obtained from a solid-state electronic image sensing device of this kind, the practice in the prior art is to obtain the video signal for focusing control directly from the solid-state electronic image sensing device. This necessitates special-purpose circuitry for pre-processing the video signal, as a result of which the video camera is increased in size.

Many video cameras have both the AE function for automatically setting amount of exposure and the AF function for automatic control of focusing. Since these functions are achieved in a time series in which automatic adjustment of exposure is performed first and automatic adjustment of focusing is performed next, a comparatively long period of time is needed to implement these functions. In particular, when a subject is preliminarily imaged using a solid-state electronic image sensing device and automatic control of exposure and automatic control of focusing are performed by using the video signal obtained, 1/60 of a second is required to output one field of the video signal. As a result, when preliminary imaging is performed a number of times for the sake of both control operations, this is likely to require an extended period of time.

SUMMARY OF THE INVENTION

Accordingly, an object of the present invention is to provide a video camera in which it is possible to perform various types of photometry, such as average photometry, partial photometry and split photometry, at one time using a video signal obtained from a solid-state electronic image sensing device, whereby exposure conditions can be set that correspond to a variety of environments in which the subject is located.

Another object of the invention is to reduce the size of a video camera of the type in which focusing is controlled using a video signal obtained from a solid-state electronic image sensing device.

A further object of the invention is to shorten the time needed for automatic control of exposure and automatic control of focusing in a video camera in which such control of exposure and focusing is achieved using a video signal obtained from a solid-state electronic image sensing device by preparatory or preliminary imaging.

According to a first aspect of the present invention, there is provided a video camera having an image pick-up optical system which includes a solid-state electronic image sensing device for outputting at least two fields of a video signal with regard to one frame by interlaced scanning, the video camera comprising a photometric-area setter for setting photometric areas, which differ for every field in one frame, within a photographic area of the solid-state electronic image sensing device, a luminance-signal extractor for extracting a luminance-signal component from the video signal outputted by the solid-state electronic image sensing device, an integrator for integrating the luminance-signal component, which has been extracted by the luminance-signal extractor over an integration interval designated by a given integration control signal, and outputting a signal representing the integrated value, an integration controller for outputting the integration control signal that designates the integration interval with regard to a horizontal scanning interval and vertical scanning interval, which correspond to the photometric area, in such a manner that integration is performed by the integrator over the photometric area set for every field by the photometric-area setter, and applying the integration control signal to the integrator and a photometric-value calculator for adding the integrated values, which are obtained from the integrator field by field over the photometric area in which the integration has been performed within the vertical scanning interval, and calculating a photometric value for every field from a value resulting from addition.

The first aspect of the invention can be expressed in the form of a method as well. Specifically, a photometric method in a video camera according to the first aspect of the present invention comprises the seeps of setting photometric areas, which differ for every field in one frame of a video signal, within a photographic area of a solid-state electronic image sensing device, setting an integration interval with regard to a horizontal scanning interval and a vertical scanning interval corresponding to the photometric area, extracting a luminance-signal component from the video signal outputted by the solid-state electronic image sensing device, integrating the luminance-signal component over the integration intervals of the horizontal scanning direction and vertical scanning direction, adding the integrated values, which have been obtained by this integration, field by field over the photometric area in which the integration has been performed within the vertical scanning interval, and calculating a photometric value for every field from a value resulting from addition.

The luminance-signal component is taken to mean not only a luminance signal in the strict sense, in which color signals R, G and B are added at a prescribed ratio to produce the luminance signal, but also signal components that may be regarded as luminance-signal components. For example, a photometric signal can be obtained also by performing integration with regard to the G component among the color signals mentioned above.

According to this invention, photometry using a solid-state electronic image sensing device is carried out for a different photometric area set for each field in one frame of the video signal, and a photometric value is obtained with regard to each photometric area.

Since the image of each field constructing one frame may be considered as representing the image of the field of view at substantially the same point in time, the photometric value found for every field in this one frame can be thought of as being a photometric value in the field of view at substantially the same point in time.

By way of example, if so-called pseudo-frame photography is performed using a special solid-state electronic image sensing device such as a frame interline transfer (FIT) CCD, each of the fields constructing a frame can be exposed substantially simultaneously. If stated in simple terms, the pseudo-frame photography mentioned here refers to a photographic method that involves superimposing the exposure time period of a first field and the exposure time period of a second field in a slightly offset state and setting the lengths of both time periods to be equal. Accordingly, if photometry is performed by setting a photometric area that differs for each field in one frame of a video signal obtained by such pseudo-frame photography, each photometric value will be a photometric value in the image of a field of view of the same point in time. Pseudo-frame photography of this type is described in the specification of Japanese Patent Application Laid-Open (KOKAI) No. 4-137874, by way of example.

Accordingly, by setting photometric areas of sizes that differ from one another for every field in one frame or by setting photometric areas within ranges that do not overlap one another in a photographic area, photometry becomes possible in a variety of variations and proper exposure conditions corresponding to the environment of photography can be set.

In a preferred embodiment of the invention, a first photometric area over substantially the entirety of the photographic area and a second photometric area contained in the first photometric area and smaller than the first photometric area are set for every field in one frame.

The first photometric area is for measuring average brightness within the photographic area, and the second photometric area is for obtaining brightness of a main subject.

In accordance with the embodiment described above, it is possible to set exposure conditions corresponding to the difference in luminance between the main subject and the background.

In another preferred embodiment of the invention, photometric areas are set in ranges of the photographic area that do not overlap each other.

In accordance with the embodiment described above, photometry regarding different ranges that do not overlap one another within the photographic area can be performed simultaneously. In other words, so-called split photometry is possible.

The characterizing feature of the first aspect of the invention described above is that photometric areas that differ from one another are set field by field in one frame, and integration of the luminance-signal component is performed over the photometric area for each field. By contrast, a characterizing feature of a second aspect of the present invention is that at least two types of photometric time periods are set for a prescribed plurality of horizontal scanning lines in the photographic area, and integration of the luminance signal is performed in each photometric time period. The integrated values obtained are added according to each type of photometric time period, and a photometric value is calculated for each type of photometric time period from the values obtained by addition.

In accordance with the second aspect of the invention, an advantage is that exposure conditions corresponding to the lighting conditions of the subject can be set. An additional advantage is that since photometric values are obtained with regard to photometric areas of a plurality of types in the time period of at least one field, the time required for photometry can be shortened.

In accordance with a third aspect of the present invention, there is provided a video camera equipped with an image pick-up optical system which includes an image pick-up lens and a solid-state electronic image sensing device having color filters for converting a light image, which is incident through the image pick-up lens, into a video signal and outputting the video signal, the video camera comprising a color separating circuit for separating the video signal outputted by the solid-state electronic image sensing device into color components and outputting color signals of the three primary colors, an amplifier circuit for correcting for a disparity in level of output color signals from the color separating circuit, the disparity being caused by a difference in optical transmittances of the color filters of the solid-state electronic image sensing device, a resampling circuit for resampling the output color signals from the amplifier circuit and converting the output color signals into color-sequential signals corresponding to an array of the color filters in the solid-state electronic image sensing device, a high-frequency component extractor for extracting high-frequency components for range-finding from the color-sequential signals outputted by the resampling circuit, and focusing controller for performing focusing control of the image pick-up lens based upon the high-frequency components of the color-sequential signals extracted by the high-frequency component extractor.

A focusing control method according to the third aspect of the present invention comprises the steps of preliminarily imaging a light image, which is incident through an image pick-up lens, by a solid-state electronic image sensing device having color filters, separating a video signal obtained from the solid-state electronic image sensing device by the preliminary imaging into color signals of the three primary colors, correcting for a disparity in level of the color signals caused by a difference in optical transmittances of the color filters of the solid-state electronic image sensing device, resampling the color signals corrected for the disparity in level and converting the color signals into color-sequential signals corresponding to an array of the color filters in the solid-state electronic image sensing device, extracting high-frequency components for rangefinding from the color-sequential signals, and performing focusing control of the image pick-up lens based upon the high-frequency components extracted from the color-sequential signals.

According to this invention, focusing control makes use of the color-sequential signals obtained by resampling the color signals corrected for the disparity in level caused by the difference in the optical transmittance of the color filters possessed by the solid-state electronic image sensing device.

The color separating circuit, amplifier circuit and resampling circuit for applying signal processing to the video signal obtained from the solid-state electronic image sensing device generally are provided in a video camera in order to signal-process and record the video signal obtained from the solid-state electronic image sensing device.

Accordingly, circuitry for processing the video signal in order to control focusing and circuitry for processing the video signal in order to perform recording can be shared. This means than it is unnecessary to separately provide a special-purpose circuit in order to process the video signal for the purpose of focusing control, thereby making it possible to reduce the size of the video camera.

According to this invention, the repetition-frequency components produced in the video signal owing to the disparity in the optical transmittances of the color filters provided in the solid-stake electronic image sensing device are removed to some extent by the aforementioned amplifier circuit. As a result, highly precise focusing control is possible without impediment from the repetition-frequency components based upon the array of the color filters.

In a preferred embodiment of this aspect of the invention, a white-balance adjustment is performed by the amplifier circuit. Owing to the white-balance adjustment, it is possible to further reduce the adverse influence of the repetition-frequency components ascribed to the array of color filters. This in turn makes possible focusing control of even greater accuracy.

According to a fourth aspect of the present invention, there is provided a video camera equipped with an image pick-up optical system which includes a solid-state electronic image sensing device for outputting two fields of a video signal with regard to one frame by interlaced scanning, and an image pick-up lens for forming an image of a subject on the solid-state electronic image sensing device, the video camera comprising a photometric unit for integrating a luminance-signal component, which is extracted from the video signal outputted by the solid-state electronic image sensing device, over a prescribed photometric area set within a photographic area of the solid-state electronic image sensing device, thereby obtaining a photometric value for setting exposure conditions, an exposure controller for adjusting amount of exposure based upon the photometric value obtained by the photometric unit, a focusing controller for obtaining an integrated value for focusing control by integrating high-frequency components for rangefinding, which are extracted from the video signal outputted by the solid-state electronic image sensing device, over a prescribed rangefinding area set within the photographic area of the solid-state electronic image sensing device, and adjusting focusing position of the image pick-up lens based upon the integrated value, a changeover unit for alternately switching between the photometric unit and the focusing controller in such a manner that the photometric unit performs the integration of the luminance-signal component over the photometric area with regard to one field of the video signal from the two fields thereof constructing the one frame and the focusing controller performs the integration of the high-frequency components over the rangefinding area with regard to the other field of the video signal from the two fields thereof constructing the one frame, and a controller for controlling the focusing controller in such a manner that the focusing controller performs integration of the high-frequency components and adjustment of the focusing position on the condition that amount of exposure has been adjusted by the exposure controller.

A method of photometry and detection of focusing position in a video camera according to the fourth aspect of the present invention comprises the steps of preliminarily imaging an image of a subject, which is represented by a light image incident through an image pick-up lens, by a solid-state electronic image sensing device, reading out, from the solid-state electronic image sensing device, two fields of a video signal with regard to one frame by interlaced scanning, obtaining a photometric value for setting exposure conditions by extracting a luminance-signal component from one field of the video signal of the two fields thereof and integrating this luminance-signal component over a prescribed photometric area set within a photographic area of the solid-state electronic image sensing device, adjusting amount of exposure based upon the photometric value, obtaining, after adjustment of the amount of exposure, an integrated value for focusing by extracting high-frequency components for rangefinding from the other field of the video signal of the two fields thereof and integrating these high-frequency components over a prescribed rangefinding area set within the photographic area of the solid-state electronic image sensing device, and adjusting the focusing position of the image pick-up lens based upon this integrated value.

In accordance with this aspect of the present invention, automatic control of exposure and automatic control of focusing are performed using the video signal obtained from the solid-state electronic image sensing device by preliminarily imaging the subject. The integration operation for automatic exposure control and the integration operation for automatic focusing control are performed alternately every field with regard to the video signal of two fields constructing one frame read out of the solid-state electronic image sensing device by interlaced scanning.

Accordingly, the integration operations for exposure control and focusing control can be performed substantially simultaneously using the video signal outputted by the solid-state electronic image sensing device, and it is possible to perform automatic exposure control and automatic focusing control in a short period of time prior to actual photography.

Further, in accordance with this aspect of the invention, integration of the high-frequency components of the video signal for focusing control is carried out after amount of exposure is adjusted appropriately. This makes highly accurate control of focusing possible.

In accordance with a preferred embodiment of this aspect of the invention, when the amount of exposure has been changed during integration for focusing control, integration for focusing control is performed anew after the change in amount of exposure. In a case where there is a change in exposure conditions during focusing control, accurate focusing control is not assured. A change in exposure conditions occurs owing to a change in environment, movement of the subject, etc. In accordance with this embodiment, integration of the high-frequency components is performed anew if there has been a change in the exposure conditions during focusing control. As a result, accurate focusing control is possible at all times and it is also possible to carry out focusing control that follows up a moving subject. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other features and advantages of the present invention will be apparent from the following description taken in conjunction with the accompanying drawings which are given by way of illustration only and thus are not limitative of the present invention, in which like reference characters designate the same or similar parts throughout the figures thereof, and wherein:

FIG. 23 is a diagram showing the storage areas of addition data for rangefinding;

DESCRIPTION OF THE PREFERRED EMBODIMENTS

First Embodiment

A first embodiment in which the present invention is applied to a digital still-video camera will be described in detail with reference to the drawings.

Figure 1:
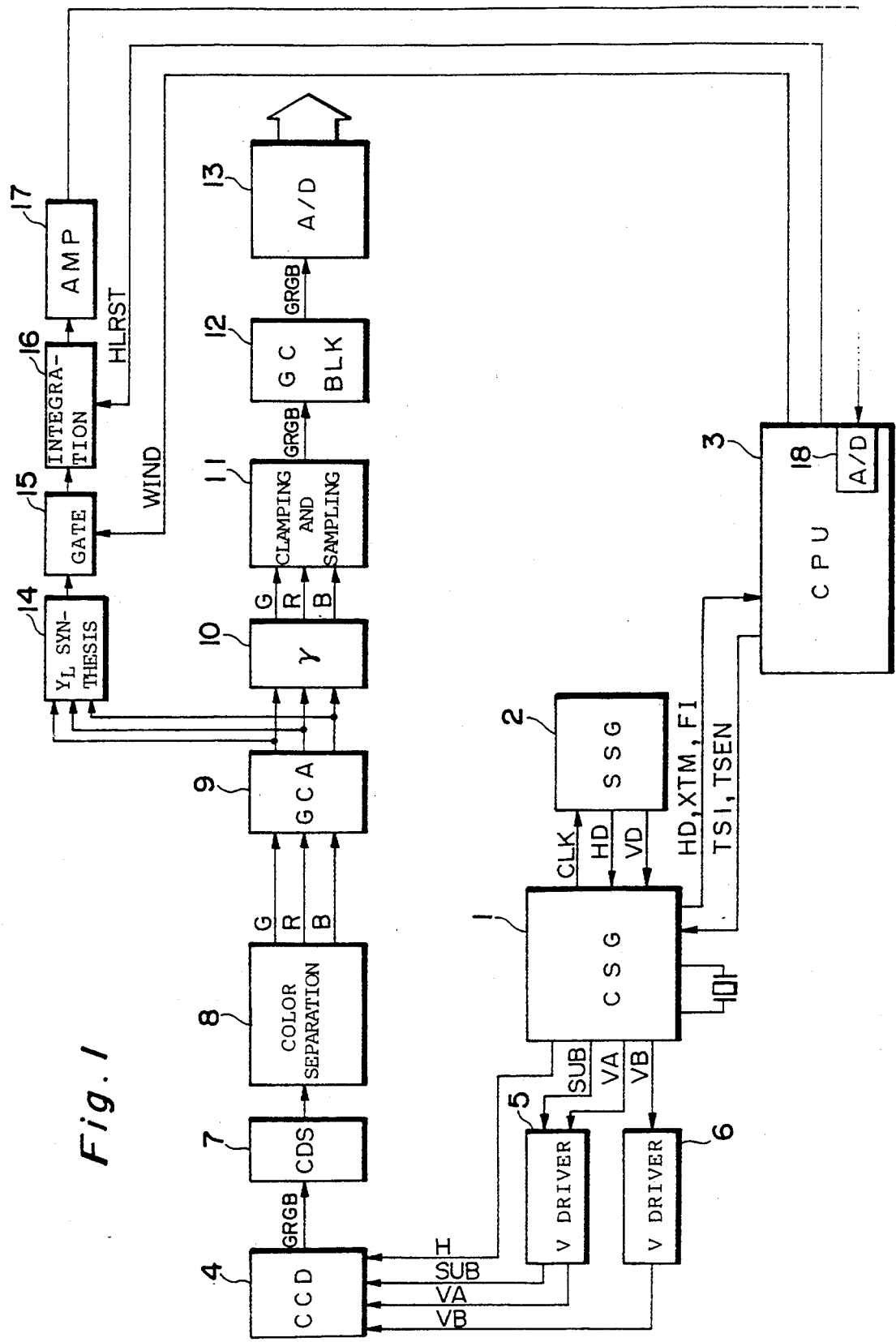
FIG. 1 is a block diagram illustrating the electrical configuration of a digital still-video camera according to a first embodiment of the present invention.

FIG. 1 is a block diagram illustrating the electrical configuration of the digital still-video camera.

The camera includes a clock signal generating circuit (hereinafter referred to as a "CSG") 1 for generating a clock signal CLK, horizontal transfer pulses H for driving the horizontal transfer path of a CCD (charge-coupled device) 4, substrate pulses SUB for sweeping out unnecessary charge, A-field vertical transfer pulses VA and B-field vertical transfer pulses VB. The CSG 1 further generates a field index signal FI and an X-timing signal XTM for firing a strobe.

The clock signal CLK is applied to a synchronizing signal generating circuit (hereinafter referred to as an ("SSG") 2, which generates a horizontal synchronizing signal HD and a vertical synchronizing signal VD based upon the clock signal CLK. The signals HD and VD are applied to the CSG 1.

The horizontal transfer pulses H are applied to the CCD (a solid-state electronic imaging device) 4. The substrate pulses SUB and A-field vertical transfer pulses VA are applied to the CCD 4 via a V driver 5, and the B-field vertical transfer pulses are applied to the CCD 4 via a V driver 6.

The field index signal FI, X-timing signal XTM and horizontal synchronizing signal HD are applied to a CPU 3. The CPU 3 provides the CSG 1 with a shutter-enable signal TSEN, which indicates that the exposure conditions have been set, and an electronic-shutter control signal TS1 for starting exposure in the CCD 4.

Interlaced photography is performed in the CCD 4 by virtue of the substrate pulses SUB, the A-field vertical transfer pulses VA, the B-field vertical transfer pulses VB and the horizontal transfer pulses H, video signals (color-sequential signals of GRGB) of A and B fields are produced alternately field by field, and these signals are read out in successive fashion. Drive of the CCD 4 (namely image pick-up and readout of the video signal) is performed at least at the time of photography and in photometric processing that precedes it.

The video signals of the A and B fields outputted by the CCD 4 are applied to a color separating circuit 8 through a correlated double-sampling circuit (CDS) 7. The color separating circuit 8 separates the input video signal into color signals of the three primary colors G (green), R (red) and B (blue), which represent the image of a subject.

The color signals G, R, B are subjected to a color-balance correction by a gain-controlled amplifier circuit (hereinafter referred to as a "GCA") 9, after which a tone correction is applied by a gamma-corrector circuit 10. The resulting corrected signals enter a clamping and resampling circuit 11.

The clamping and resampling circuit 11 clamps the three color signals R, G, B and converts them back into the color-sequential signals GRGB ... by resampling.

The color-sequential signals enter a gain-controlled blanking circuit 12. The latter amplifies the color-sequential signals to a suitable level in order for these signals to be recorded and also applies a blanking signal to them. The output signal of the circuit 12 is then converted into digital image data by an A/D converter 13.

As will be described later in detail, photometric processing and exposure control (control of the iris and shutter speed) based upon the photometric value are performed prior to photography. The photometric processing is executed based on the output signal of the GCA 9. Photography is performed after this photometric processing and exposure control. The video signal obtained from the CCD 4 by photography is rendered into digital image data through the above-described circuits 10, 11, 12 and 13, the digital data is subjected to such processing as Y/C separation and data compression by image-data processing circuitry (not shown), and then the resulting image data is recorded on a recording medium such as a memory card.

Figure 2:
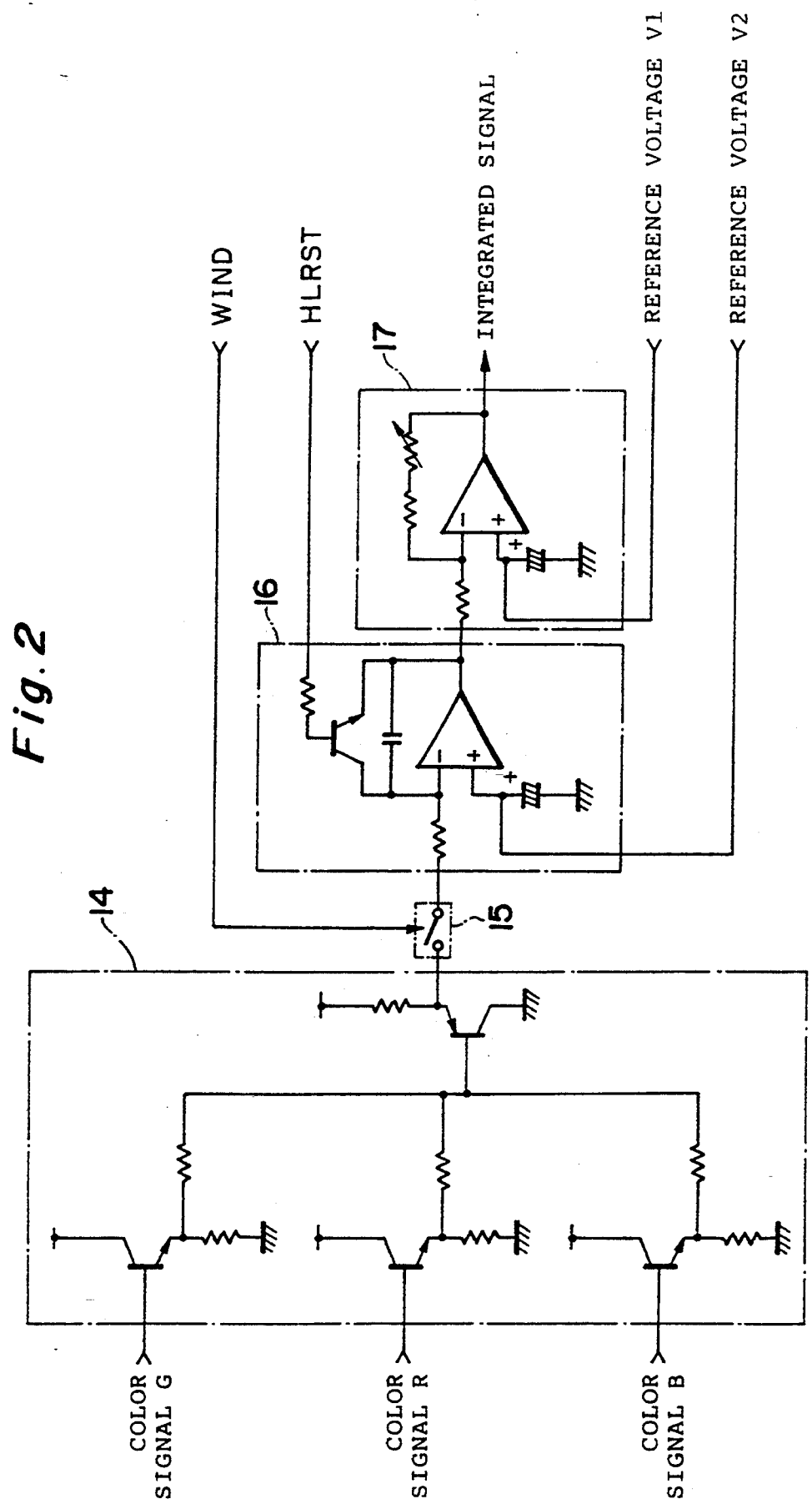
FIG. 2 is a circuit diagram illustrating, in greater detail, the electrical configuration of circuitry necessary for photometry in the digital still-video camera shown in FIG. 1.

A $Y_L$ synthesizing circuit 14, a gate circuit 15, an integrating circuit 16 and an amplifier circuit 17 are provided in order to execute photometric processing. FIG. 2 illustrates an example of the specific electrical configuration of these circuits. The CPU 3 outputs a window signal WIND for controlling the gate circuit 15 and a reset signal HLRST for resetting the integrating circuit 16. The timing of the signals WIND and HLRST will be described later. Further, in this embodiment, the CPU 3 has an internal A/D converter 18.

The color signals R, G and B outputted by the GCA 9 are added by the $Y_L$ synthesizing circuit 14, which produces a relatively low-frequency luminance signal $Y_L$ (hereinafter referred to simply as a luminance signal $Y_L$). The luminance signal $Y_L$ passes through the gate circuit 15 for a length of time during which the window signal WIND is applied in the prescribed horizontal scanning interval. The integrating circuit 16 is reset when the reset signal HLRST is applied, after which it integrates the luminance signal $Y_L$ entered from the gate circuit 15. The integrated signal from the integrating circuit 16 is amplified by the amplifier circuit 17, after which the amplified signal is converted into digital integrated data by the A/D converter 18 of the CPU 3 immediately before the integrating circuit 16 is reset. The digital integrated data is accepted by the CPU 3. Reference voltages V1, V2 of the integrating circuit 16 and amplifier circuit 17 apply appropriate offsets to these circuits.

In this embodiment, average photometry (hereinafter referred to as "AV photometry") for measuring average brightness within the field of view and spot photometry (hereinafter referred to as "SP photometry") for measuring brightness of the main subject within the field of view are performed alternately every field interval of the video signal read out of the CCD 4, as will be described later. This is particularly useful in a case where the brightness of the main subject and the brightness of the background within the field of view differ and it is necessary to suitably set exposure conditions conforming to this difference. The A-field image and B-field image constructing one frame may be considered to represent images of the field of view at substantially the same point in time. In this embodiment, therefore, the video signal of the A field is used for AV photometry and the video signal of the B field is used for SP photometry.

Further, in this embodiment the integration performed by the integrating circuit 16 is performed alternately, every horizontal scanning interval, with the A/D conversion operation of the A/D converter 18 and addition processing.

Figure 3:
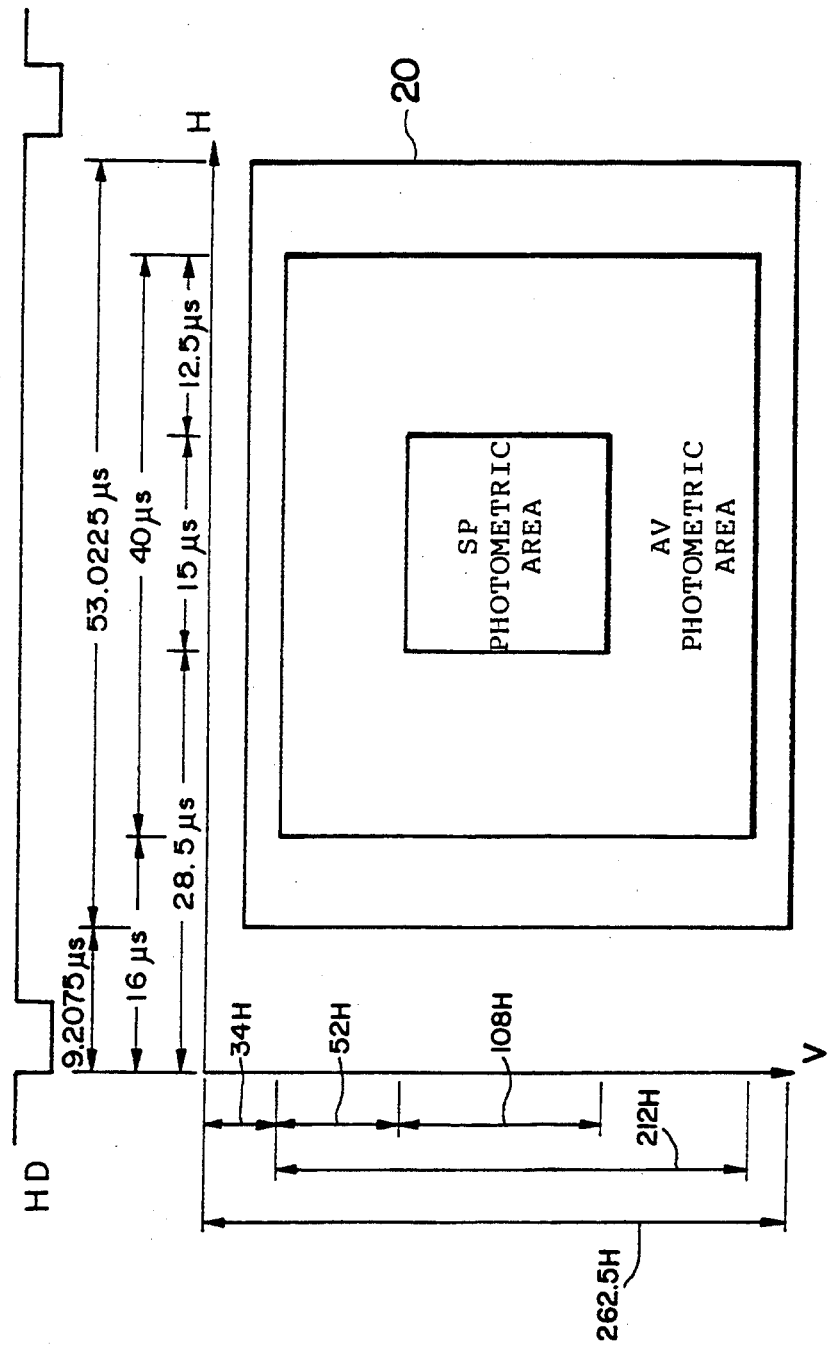
FIG. 3 is a diagram showing photometric areas set within a photographic area.

FIG. 3 illustrates an AV photometric area and an SP photometric area set in a photographic area 30.

The AV photometric area basically is set to cover substantially the entirety of the photographic area. In this embodiment, the AV photometric area is set in the horizontal direction to a time period of 40 µs that starts upon elapse of 16 µs from the trailing end of the horizontal synchronizing signal HD (i.e., from the moment at which the horizontal scanning interval starts) and, in the vertical direction, to an area from the 35th horizontal scanning line to the 246th horizontal scanning line.

The SP photometric area is set as a small area at any position within the photographic area 30. In this embodiment, the SP photometric area is set at the central portion of the photographic area 30. Further, in the horizontal direction, the SP photometric area is set to a time period of 15 µs that starts upon elapse of 28.5 µs from the trailing end of the horizontal synchronizing signal HD. In the vertical direction, the SP photometric area is set to an area from the 87th horizontal scanning line to the 194th horizontal scanning line.

Figure 4:
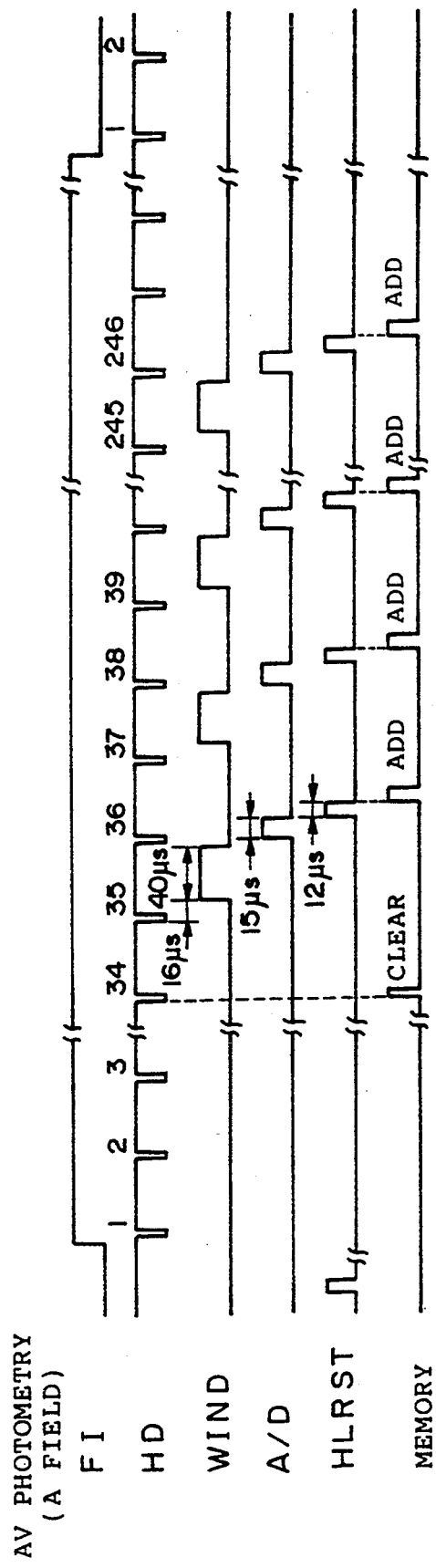
FIG. 4 is a time chart for a case in which AV photometry is performed.

In AV photometry in the A-field time period, as illustrated in FIG. 4, the window signal WIND, which has a pulse width of 40 µs, is applied to the gate circuit 15 16 µs after the trailing edge of the 35th horizontal synchronizing signal HD. During the time that the window signal WIND is being applied, the gate circuit 15 passes the entering luminance signal $Y_L$ so that this signal is fed into the integrating circuit 16.

The integrating circuit 16, which has been reset in the preceding field, integrates the luminance signal $Y_L$ applied thereto through the gate circuit 15. When the window signal WIND reverts to the L level so that entry of the luminance signal $Y_L$ to the integrating circuit 16 ceases, the integrated output of the integrating circuit 16 is held as is and is converted into digital data by the A/D converter 18 incorporated within the CPU 3. The time required for the A/D conversion is 15 µs in this embodiment. After the A/D conversion, the integrating circuit 16 is reset by the horizontal-line reset signal HLRST, which is provided by the CPU 3, to prepare for the next integrating operation.

A storage area for the AV integrated data in a memory (e.g., a RAM) peripheral to the CPU 3 is cleared in synchronism with the 34th horizontal synchronizing signal HD. The integrated value converted into digital data by the A/D converter 18 is added to the previous data (which will be zero in the case of the first operation owing to clearing) and the sum is stored in the storage area for the AV integrated data.

The A/D conversion performed by the A/D converter 18, the resetting of the integrating circuit 16 and the processing for adding the integrated data are performed in the 36th horizontal scanning interval that is next.

Thus, as set forth above, the integration of the luminance signal $Y_L$ by the integrating circuit 16 along one horizontal scanning line in the AV photometric area and the A/D conversion of the integrated signal obtained by this integration, the resetting of the integrating circuit 16 and the addition of the integrated data to the memory are repeatedly performed alternately every horizontal scanning interval. The repetition of these operations is performed up to the 246th horizontal scanning interval, namely over the entirety of the AV photometric area.

Figure 5:
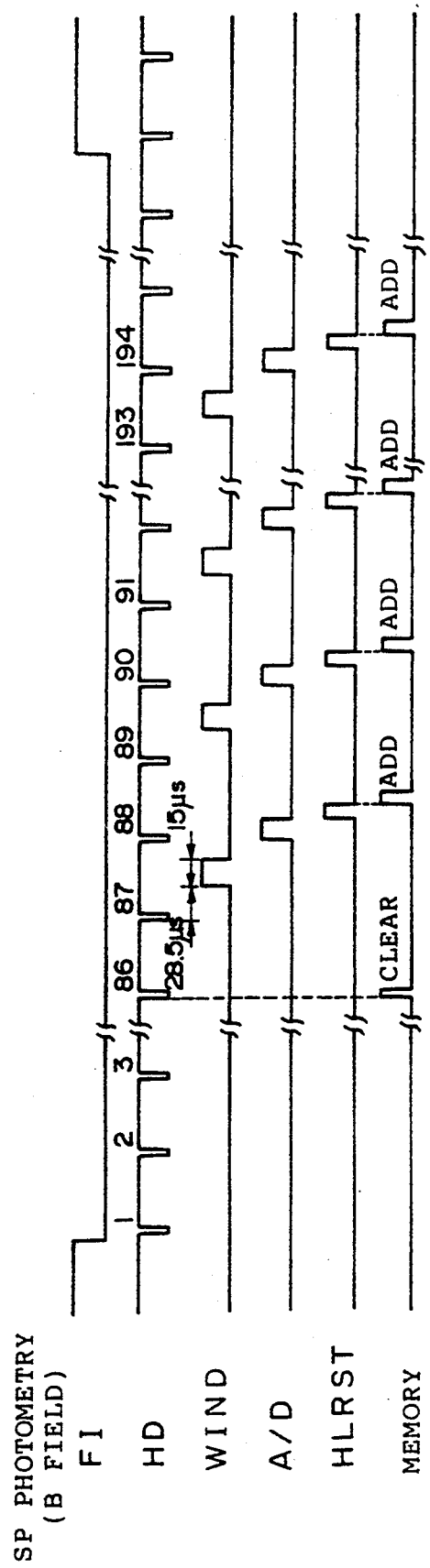
FIG. 5 is a time chart for a case in which SP photometry is performed.

In the SP photometric area in the B-field time period, as shown in FIG. 5, the window signal WIND, which has a pulse width of 15 µs, is applied to the gate circuit 15 28.5 µs after the trailing edge of the 87th horizontal synchronizing signal HD. During the time that the window signal WIND is being applied, the integrating circuit 16 integrates the luminance signal $Y_L$ applied thereto. The window signal WIND is applied every other horizontal scanning interval up to the 193rd horizontal scanning interval. The A/D conversion of the integrated signal from the integrating circuit 16 into integrated data, the resetting of the integrating circuit 16 and the adding of the integrated data in the memory are performed in the next horizontal scanning interval of the integrating operation in the same manner as in the case of AV photometry described above.

Thus, integration of the luminance signal $Y_L$ is performed every other horizontal scanning interval, and A/D conversion and other processing are executed in the next horizontal scanning interval after integration. As a result, it is fully possible to deal with processing using a low-speed A/D converter. Even though integration is performed every other horizontal scanning line, integration along 54 horizontal scanning lines is possible even in SP photometry. This makes it possible to acquire a sufficient amount of integrated data for the purpose of obtaining a photometric value.

It is of course possible to perform the integration of the luminance signal $Y_L$, the A/D conversion of the integrated signal, the resetting of the integrating circuit and the integrated-data addition processing in one horizontal scanning interval using a high-speed A/D converter.

In the description given above, AV photometry is performed in the A-field interval and SP photometry is performed in the B-field interval. However, an arrangement may be adopted in which this is reversed, i.e., in which SP photometry is performed in the A-field interval and AV photometry is performed in the B-field interval.

The changeover between AV photometry and SP photometry every field interval is performed by changing over the output of the window signal WIND to the gate circuit 15 every field interval, as illustrated in FIG. 4 or FIG. 5, under the control of the CPU 3.

Figure 6:
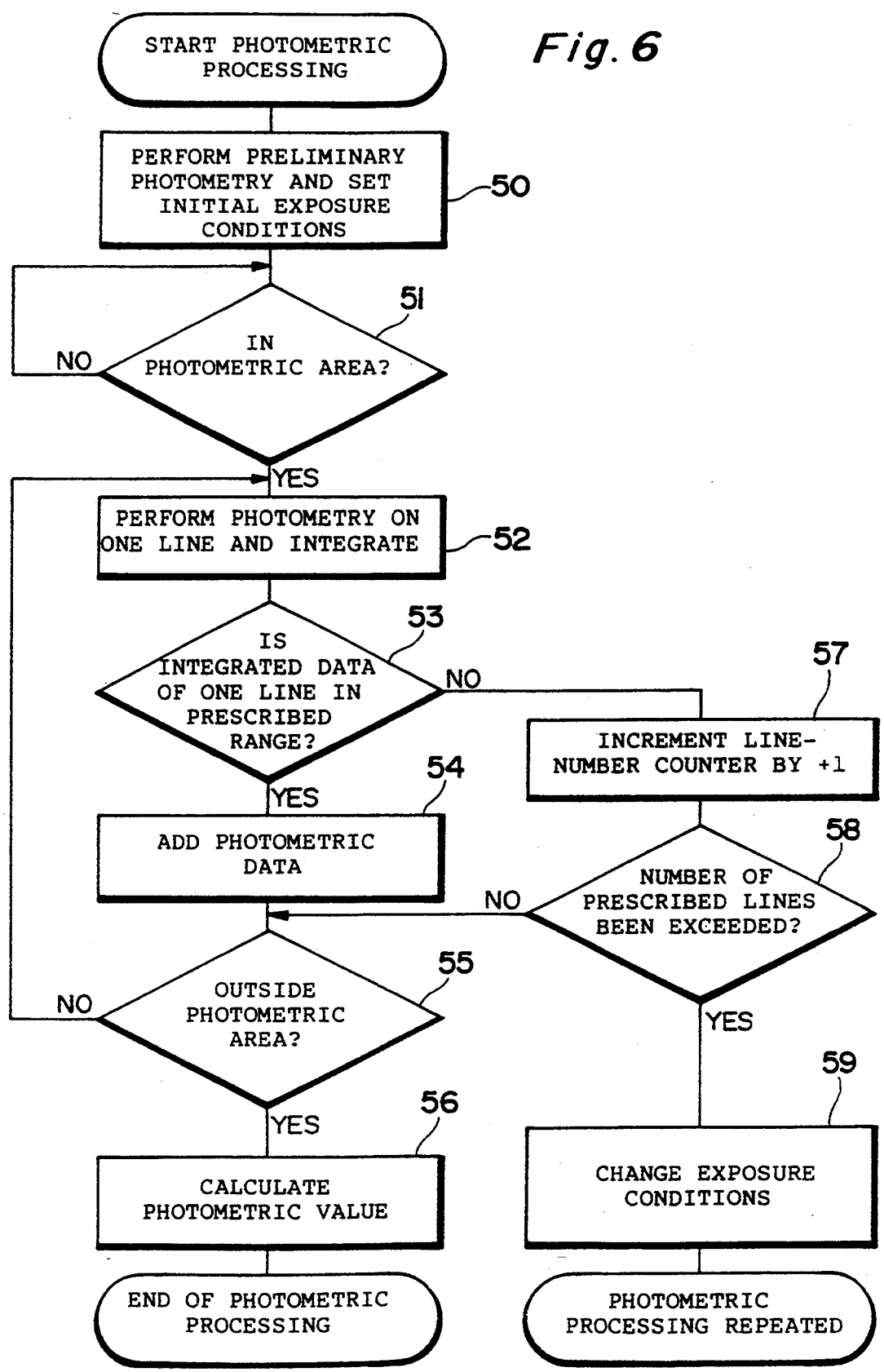
FIG. 6 is a flowchart showing the procedure of photometric processing executed by a CPU.

FIG. 6 illustrates the overall operation of photometric processing executed by the CPU 3.

At the start of photometric processing, the CPU 3 performs initial resetting of the exposure conditions and controls one or both of the iris and electronic shutter so that the initial exposure conditions will be realized (step 50). An example of an initial exposure condition that is preferred is one that is most likely statistically, e.g., an exposure quantity of EV=10 (an f-stop of F4 and a shutter speed of 1/60 sec or an f-stop of F2.8 and a shutter speed of 1/125 sec). The initial exposure quantity may be determined by a specific photometric sensor.

When the horizontal scanning interval within one photometric area is attained in either AV photometry or SP photometry (YES at step 51), the window signal WIND is outputted and the integrating circuit 16 is made to perform the integrating operation during the photometric time period in the manner described above (step 52). Upon elapse of the photometric time period, the A/D converter 18 is driven into operation to subject the integrated signal from the integrating circuit 16 to the A/D conversion so that digital integrated data will be obtained.

Next, it is determined whether the integrated data obtained resides within a prescribed range determined in advance (step 53). This involves judging whether the integrated data obtained is capable of being used as one horizontal line of a photometric value. In a case where the luminance signal $Y_L$ has become saturated in a portion along a horizontal line that is the object of photometry, the resulting integrated data is unsuitable for use as a photometric value. The upper-limit value of the prescribed range is determined to be such that the integrated data based upon the saturated luminance signal $Y_L$ can be excluded. This determination is made upon considering the dynamic range of the CCD 4, the gains of the GCA 9 and amplifier circuit 17, etc. In a case where a portion along a horizontal line that is the object of photometry is very dark so that the luminance signal $Y_L$ can be construed as being due almost entirely to noise components, this integrated data also will be unsuitable for used as a photometric value. Accordingly, the lower-limit value of the prescribed range is decided to be a level at which integrated data dominated by noise components is excluded.

In a case where the integrated data obtained is indicative of a value within the prescribed range, this integrated data is added to the value in the integrated-data area of the memory (step 54). If the point is still within the photometric area (NO at step 55), the program returns to step 52. In a case where the integrated data resides outside the prescribed range, a line-number counter is incremented (step 57) and processing for adding integrated data is not performed. In other words, this integrated data is not used as a photometric value. The line-number counter is for counting the number of horizontal lines over which the integrated data is outside the prescribed range. If the value registered by the line-number counter is less than a prescribed value (NO at step 58), the program returns to step 52 via step 55.

The operation set forth above is performed over the entirety of the photometric area while two horizontal scanning intervals are repeated as one period. When the point departs from the range of the photometric area (YES at step 55), calculation of the photometric value is performed using the value obtained by adding the integrated data obtained thus far (step 56). The calculation of the photometric value includes an arithmetic operation of finding the average value of integrated values per one horizontal scanning line by dividing the value resulting from the addition of the integrated data by the number of lines added as integrated data. The number of lines added as integrated data is obtained by subtracting the value in the line-number counter from half the number of horizontal scanning lines in the photometric area.

On the basis of the result of calculation (the average value of the integrated values), the CPU 3 decides the exposure conditions of f-stop, shutter speed and whether or not the strobe is to be fired.

Further, in a case where the value in the line-number counter, which counts the number of horizontal lines over which the integrated data is outside the prescribed range, has exceeded a prescribed number (step 58), the exposure conditions are changed (step 59) and the integrated-data area of the memory is cleared, after which photometric processing from step 51 is repeated at the moment the next frame or field starts.

On the occasion of a change in the exposure conditions, it will suffice to change the amount of exposure one step (e.g., ±2 EV) at a time, in which the amount of exposure is made smaller than the initially set amount if much of the integrated data is outside the prescribed range, and the amount of exposure is made larger in the opposite case. In a case where the initially set amount of exposure is not so different from the actual brightness of the field of view, the appropriate amount of exposure would be found by repeating the photometric processing of FIG. 6 one or two times (one to two frame periods).

As described above, an AV photometric value $EV_{AV}$ is obtained by AV photometry in the A-field interval shown in FIG. 4. Further, an SP photometric value $EV_{SP}$ is obtained by SP photometry in the B-field interval shown in FIG. 5.

Figure 7:
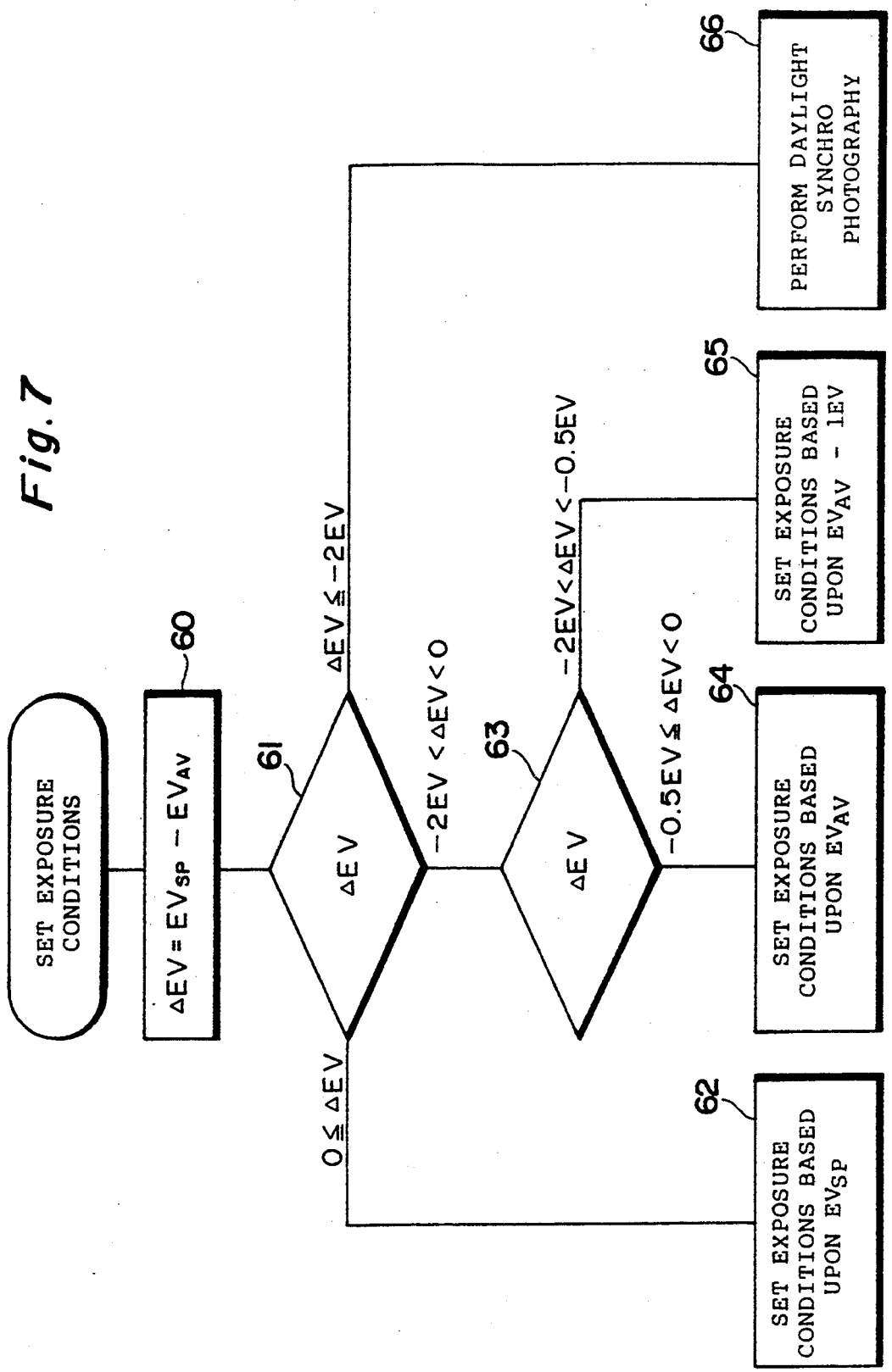
FIG. 7 is a flowchart showing the procedure of processing, executed by a CPU, for setting exposure conditions.

FIG. 7 is a flowchart illustrating the procedure of processing, executed by the CPU 3, for setting exposure conditions (f-stop and shutter speed) based upon the AV photometric value $EV_{AV}$ and SP photometric value $EV_{SP}$ obtained by the AV photometry and SP photometry described above.

The CPU 3 finds the difference $\Delta EV$ between the SP photometric value $EV_{SP}$ and the AV photometric value $EV_{AV}$ (step 60) and then determines whether the difference $\Delta EV$ between these photometric values is greater than zero, between zero and −0.5 EV, between −0.5 EV and −2 EV or less than −2 EV (steps 61, 63).

If the difference $\Delta EV$ between the photometric values is determined to satisfy the relation $0 \leq \Delta EV$, i.e., if it is judged that the main subject at the center is bright and the background is dark, the CPU 3 sets the exposure conditions based upon the SP photometric value $EV_{SP}$ (step 62). The reason for this is that the main subject will be photographed too darkly if the exposure conditions are set based upon the average photometric value $EV_{AV}$ and because it is best for the main subject, which is construed to be what the photographer most wishes to photograph, to be exposed properly.

If $\Delta EV$ is determined to satisfy the relation $-0.5 \text{ EV} \leq \Delta EV < 0$, i.e., if it is judged that the difference in brightness between the main subject and the background is small, the CPU 3 sets the exposure conditions based upon the AV photometric value $EV_{AV}$ (step 64). The reason for this is that it is safe to assume that both the main subject and the background will be exposed properly if the exposure conditions are decided based upon the AV photometric value $EV_{AV}$. If the relation $-2 \text{ EV} < \Delta EV < -0.5 \text{ EV}$ is determined to hold, i.e., if it is judged that the background is bright and that the difference in luminance between the main subject and the background is comparatively large, the CPU 3 sets the exposure conditions based upon the value $EV_{AV} - 1$ EV (step 65). In other words, since the background is bright in this case, an exposure correction (a back-lighting correction) is made so as to darken the background a slight amount.

If the relation $\Delta EV \leq -2$ EV is determined to hold, i.e., if it is judged that the main subject is darker than the background and that the difference in luminance between two is very large, then it is necessary to fire the strobe in order to brighten the main subject. The CPU 3 therefore performs daylight synchronized photography. More specifically, the CPU 3 prepares to fire the strobe and sets the exposure conditions that will prevail when the strobe is fired (step 66). This case is for judging that a correction by strobe-light emission is appropriate because the main subject cannot be exposed properly even by the above-described backlighting correction.

Figure 8:
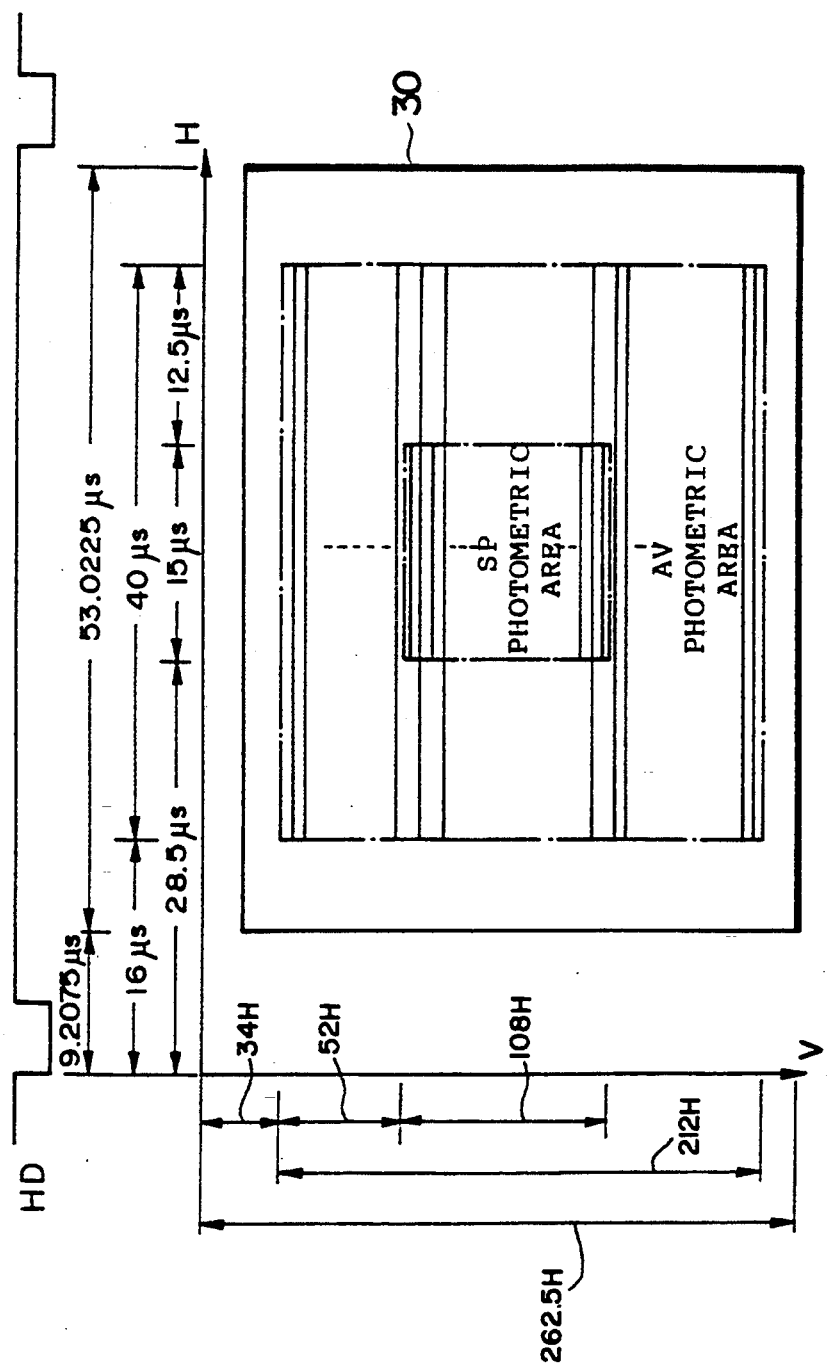
FIG. 8 is a diagram illustrating a photometric time period for every horizontal scanning line in a case where simultaneous AV and SP photometry is performed.
Figure 9:
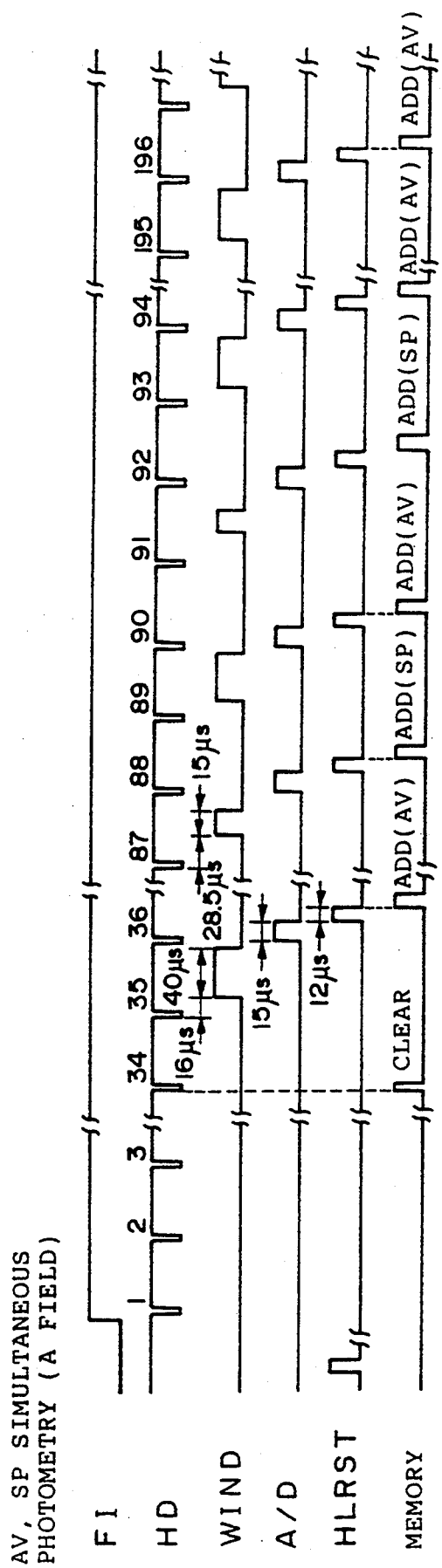
FIG. 9 is a time chart for a case where simultaneous AV and SP photometry is performed.

FIGS. 8 and 9 illustrate an embodiment for a case in which AV photometry and SP photometry are performed in the time period of one field.

FIG. 8 illustrates the integration interval along horizontal scanning lines in the AV photometric metric area and SP photometric area.

Integration is carried out every other horizontal scanning line in the AV photometric area in a range within which the AV photometric area does not overlap the SP photometric area in the vertical scanning direction. In the range within which the AV photometric area and SP photometric area overlap each other in the vertical scanning direction, the integrating operation along the horizontal scanning lines for the AV photometric area and the integrating operation along the horizontal scanning lines for the SP photometric area are performed alternately. The above-described integration is carried out every other horizontal scanning line for the sake of the A/D conversion, the resetting of the integrating circuit and processing for adding data.

From the 34th horizontal scanning line to the 86th horizontal scanning line, as shown in FIG. 9, the window signal WIND having a pulse width of 40 μs is applied to the gate circuit 15 16 μs after the trailing edge of the horizontal synchronizing signal HD. The integration of the luminance signal $Y_L$ by the integrating circuit 16, and the A/D conversion of the integrated signal in the horizontal scanning interval following the horizontal scanning interval in which this integrating operation was performed, the resetting of the integrating circuit 16 and the addition of the integrated data to the data area in the memory that is for the AV photometric area are performed alternately every horizontal scanning interval (this is photometry of the AV photometric area).

From the 87th horizontal scanning line to the 194th horizontal scanning line, the window signal WIND having a pulse width of 15 μs and the window signal WIND having the pulse width of 40 μs are applied to the gate circuit 15 alternately 28.5 μs and 16 μs, respectively, after the trailing edge of the horizontal synchronizing signal HD.

When the window signal WIND having the pulse width of 15 μs has been applied to the gate circuit 15 and the integration of the luminance signal $Y_L$ has been performed, the A/D conversion of the integrated signal in the horizontal scanning interval following the horizontal scanning interval in which the integrating operation was performed, the resetting of the integrating circuit 16 and the addition of the integrated data to the data area in the memory that is for the SP photometric area are performed (this is photometry of the SP photometric area). When the window signal WIND having the pulse width of 40 μs has been applied to the gate circuit 15 and the integration of the luminance signal $Y_L$ has been performed, the A/D conversion of the integrated signal in the horizontal scanning interval following the horizontal scanning interval in which the integrating operation was performed, the resetting of the integrating circuit 16 and the addition of the integrated data to the data area in the memory that is for the AV photometric area are performed (this is photometry of the AV photometric area).

From the 195th horizontal scanning line to the 246th horizontal scanning line, integration of the luminance signal $Y_L$ based upon the window signal WIND having the pulse width of 40 μs and the processing of the integrated data obtained by this integration are performed alternately every horizontal scanning interval in the same manner as in the zone from the 34th horizontal scanning line to the 86th horizontal scanning line (this is photometry of the AV photometric area).

By a procedure similar to that of the processing shown in FIG. 6, the CPU 3 adds the integrated data regarding one horizontal scanning line, which is obtained based upon the window signal WIND having the 40 μs pulse width, to the data area of the AV photometric storage area over one field interval, thereby calculating the AV photometric value $EV_{AV}$.

Further, through a procedure similar to that of the processing shown in FIG. 6, the CPU 3 adds the integrated data regarding one horizontal scanning line, which is obtained based upon the window signal WIND having the 15 μs pulse width, to the data area of the SP photometric storage area over one field interval, thereby calculating the SP photometric value $EV_{SP}$. This calculation is performed separately of the calculation of the AV photometric value $EV_{AV}$.

The setting of the exposure conditions is performed through a procedure similar to that shown in FIG. 7 based upon the AV photometric value $EV_{AV}$ and the SP photometric $EV_{SP}$ obtained in the manner described above.

Figure 10:
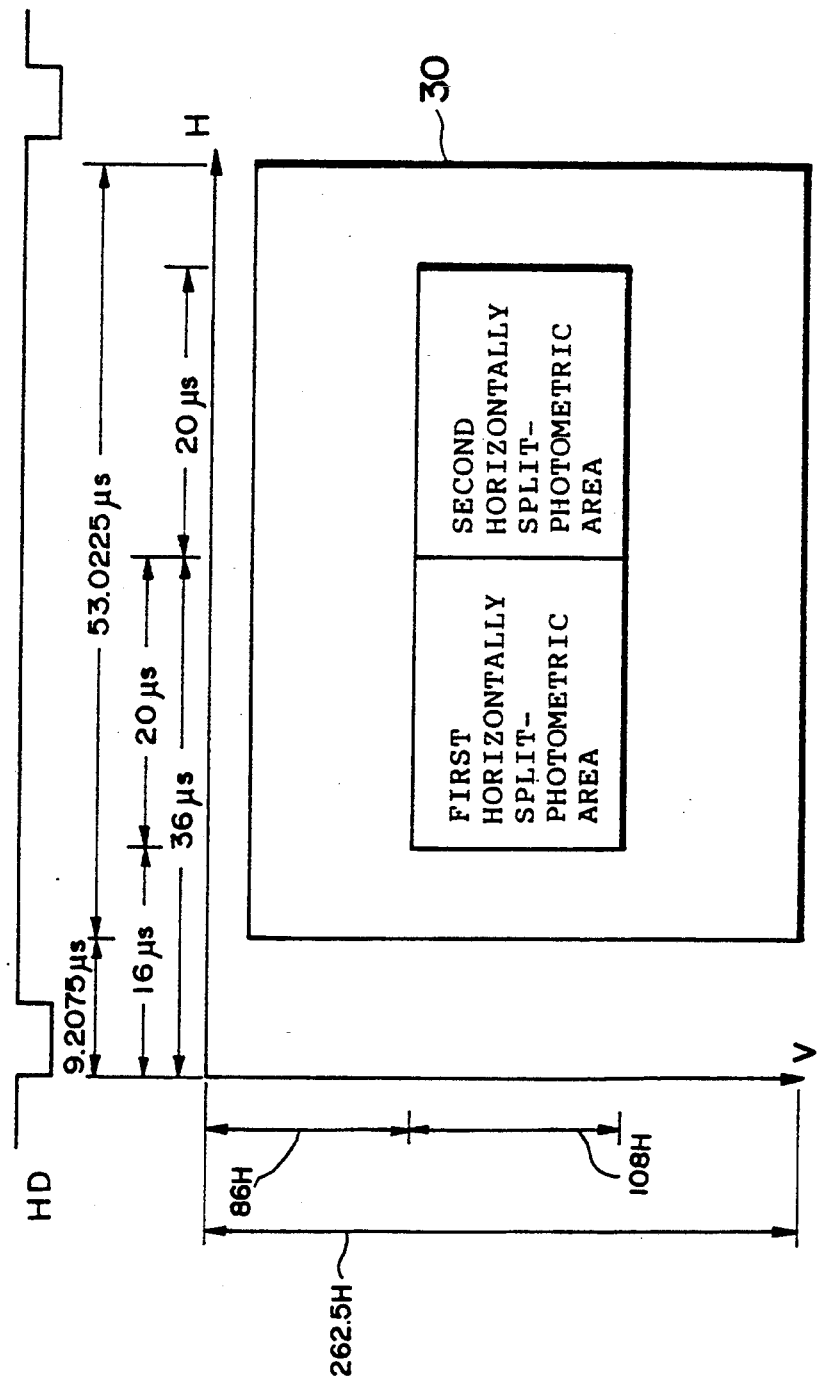
FIG. 10 is a diagram illustrating split photometric areas in the horizontal direction set within a photographic area.

FIG. 10 illustrates another embodiment of a method of setting photometric areas. This diagram shows two photometric areas set side by side in the horizontal direction within the photographic area 30 of the CCD, namely a first horizontally split photometric area and a second horizontally split photometric area.

In this embodiment the first horizontally split photometric area is set in the horizontal direction to a time period of 20 μs that starts upon elapse of 16 μs from the trailing end of the horizontal synchronizing signal HD (i.e., from the moment at which the horizontal scanning interval starts) and, in the vertical direction, to an area from the 87th horizontal scanning line to the 194th horizontal scanning line.

The second horizontally split photometric area is set in the horizontal direction to a time period of 20 μs that starts upon elapse of 36 μs from the trailing end of the horizontal synchronizing signal HD and, in the vertical direction, to an area from the 87th horizontal scanning line to the 194th horizontal scanning line.

Figure 11:
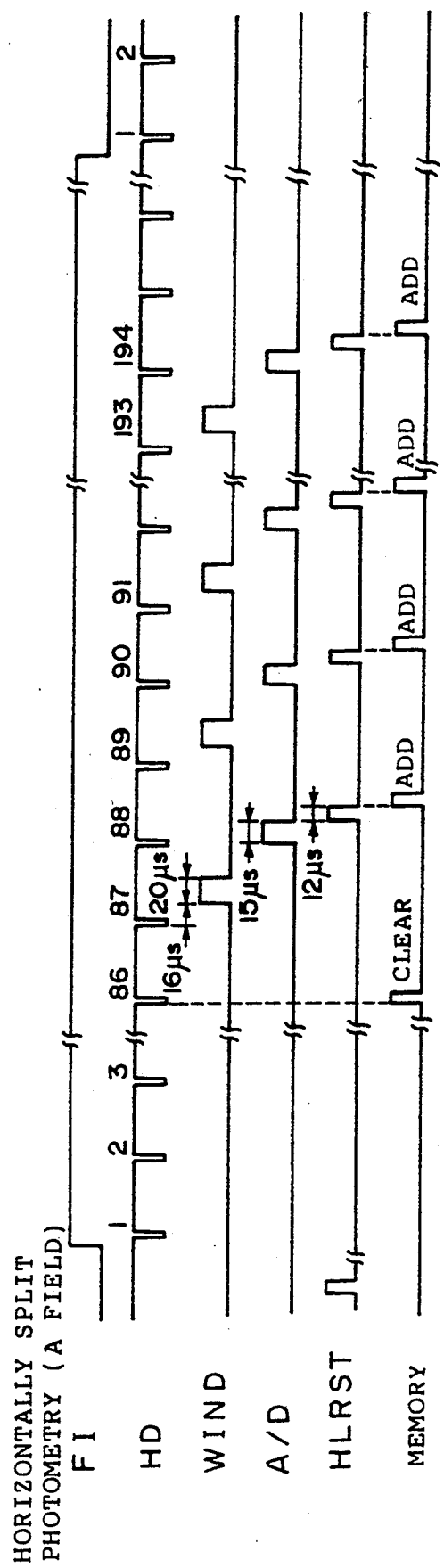
FIG. 11 is a time chart for a case where split photometry in the horizontal direction is performed with regard to an A field.
Figure 12:
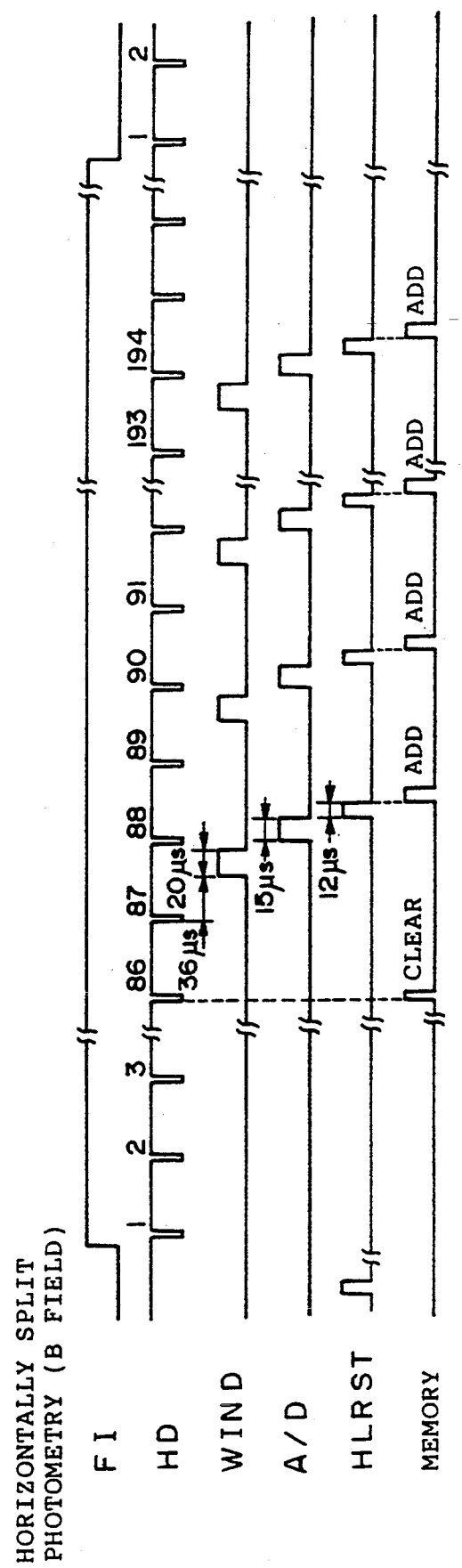
FIG. 12 is a time chart for a case where split photometry in the horizontal direction is performed with regard to a B field.

FIGS. 11 and 12 illustrate time charts for a case in which split photometry in the horizontal scanning direction is performed with regard to the first horizontally split photometric area and the second horizontally split photometric area. Photometry regarding the first horizontally split photometric area is performed in the A-field time period, and photometry regarding the second horizontally split photometric area is performed in the B-field time period. The configuration of the digital still-video camera shown in FIG. 1 is utilized as is.

In the A-field interval, as shown in FIG. 11, the window signal WIND having the 20 μm pulse width is applied to the gate circuit 15 16 μs after the trailing edge of the 87th horizontal synchronizing signal HD. The integrating circuit 16 integrates the input luminance signal $Y_L$ during this period of time.

In the B-field interval, as shown in FIG. 12, the window signal WIND having the 20 μm pulse width is applied to the gate circuit 15 36 μs after the trailing edge of the 87th horizontal synchronizing signal HD. The integrating circuit 16 integrates the input luminance signal $Y_L$ during this period of time.

The window signal WIND is applied, for both the A- and B-field time periods, every other horizontal scanning interval up to the 193rd horizontal scanning interval. The A/D conversion of the integrated signal from the integrating circuit 16 into integrated data, the resetting of the integrating circuit 16 and the adding of the integrated data in the memory are performed in the next horizontal scanning interval of the integrating operation.

The CPU 3 adds the integrated data over each of the field intervals through a procedure similar to that shown in FIG. 6, thereby calculating a first horizontally split photometric value and a second horizontally split photometric value.

Figure 13:
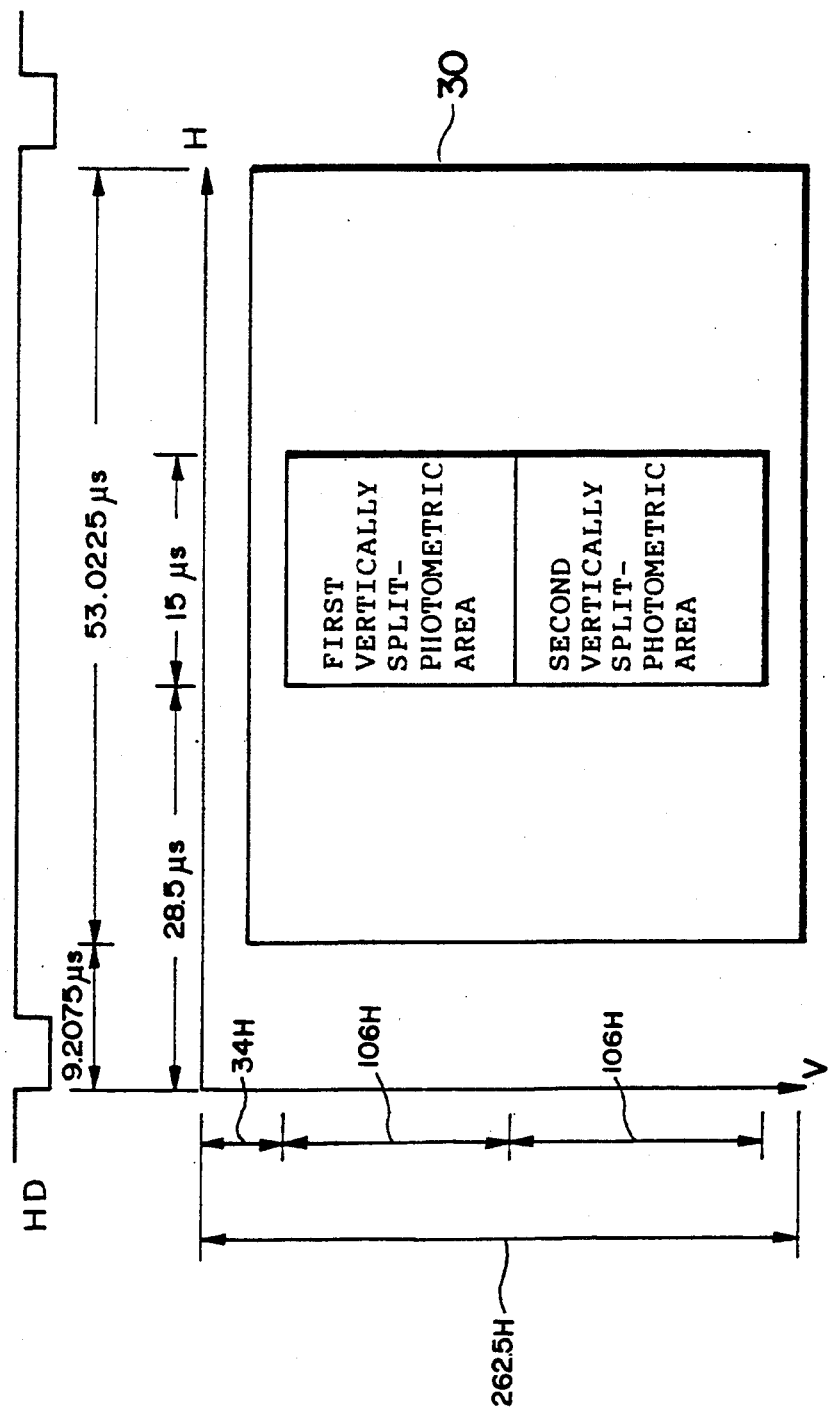
FIG. 13 is a diagram illustrating split photometric areas in the vertical direction set within a photographic area.

FIG. 13 illustrates yet another embodiment regarding a method of setting the photometric areas. Two photometric areas are set in the vertical direction within the photographic area 30 of the CCD. More specifically, a first vertically split photometric area and a second vertically split photometric area are set in the photographic area 30.

The first vertically split photometric area is set in the horizontal direction to a time period of 15 μs that starts upon elapse of 28.5 μs from the trailing end of the horizontal synchronizing signal HD (i.e., from the moment at which the horizontal scanning interval starts) and, in the vertical direction, to an area from the 35th horizontal scanning line to the 140th horizontal scanning line.

The second vertically split photometric area is set in the horizontal direction to a time period of 15 μs that starts upon elapse of 28.5 μs from the trailing end of the horizontal synchronizing signal HD and, in the vertical direction, to an area from the 141th horizontal scanning line to the 246th horizontal scanning line.

Figure 14:
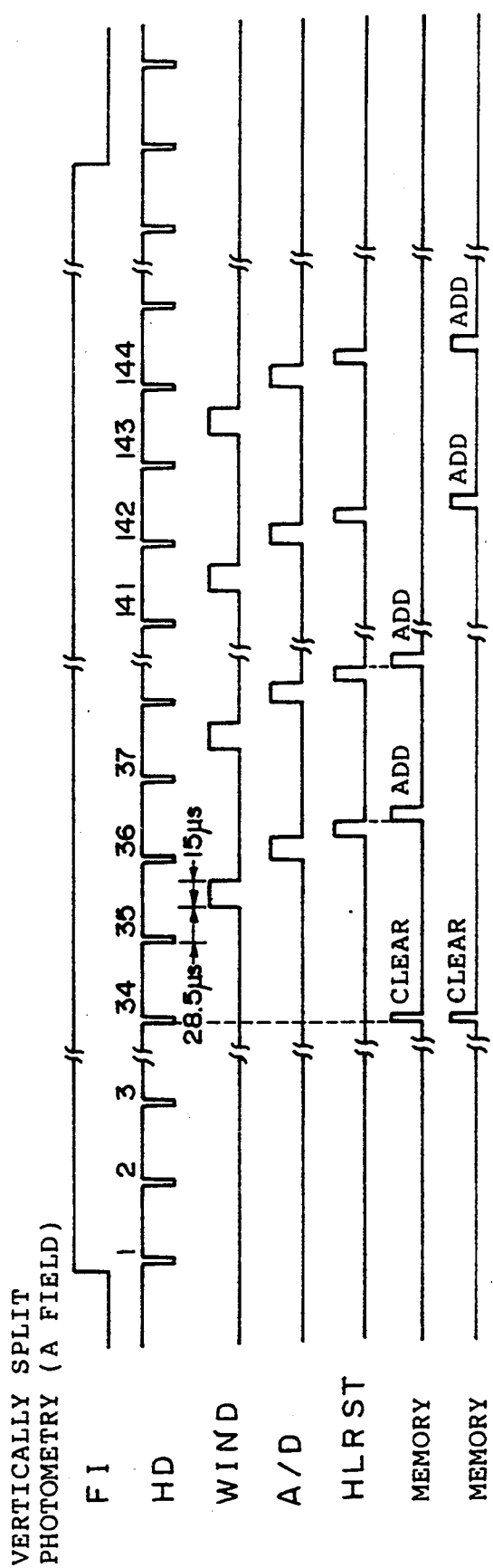
FIG. 14 is a time chart for a case where split photometry in the vertical direction is performed with regard to an A field.

FIG. 14 illustrates a time chart for a case in which split photometry in the vertical scanning direction is performed with regard to the first vertically split photometric area and the second vertically split photometric area. Photometry regarding the first vertically split photometric area and photometry regarding the second vertically split photometric area are both performed in the time period of one field.

In a certain field interval, as shown in FIG. 14, the window signal WIND having a 15 μm pulse width is applied to the gate circuit 15 28.5 μs after the trailing edge of the 35th horizontal synchronizing signal HD. The integrating circuit 16 integrates the input luminance signal $Y_L$ during this period of time. The window signal WIND is applied every other horizontal scanning interval up to the 245th horizontal scanning interval. The A/D conversion of the integrated signal from the integrating circuit 16 into integrated data, the resetting of the integrating circuit 16 and the adding of the integrated data in the memory are performed in the next horizontal scanning interval of the integrating operation.

In each field interval and through a procedure similar to that shown in FIG. 6, the CPU 3 adds the integrated data from the 35th to the 140th horizontal scanning line to calculate a first vertically split photometric value and adds the integrated data from the 141st to the 146th horizontal scanning line to calculate a second vertically split photometric value.

It can also be so arranged that the photometry in the two horizontally split photometric areas shown in FIG. 10 is performed in the time period of one field. In such case the integration along the horizontal scanning lines would be performed alternately between the first horizontally split photometric area and the second horizontally split photometric area. It can also be so arranged that the photometry in the two vertically split photometric areas shown in FIG. 13 is performed over the time period of two fields. Furthermore, arrangements can be adopted in which three or more split areas are set in the photographic area 30 in the horizontal or vertical direction, or in which a plurality of split photometric areas split in both the horizontal and vertical directions are set in the photographic area 30.

Second Embodiment

A second embodiment in which the present invention is applied to a digital still-video camera will be described in detail with reference to the drawings.

Figure 15:
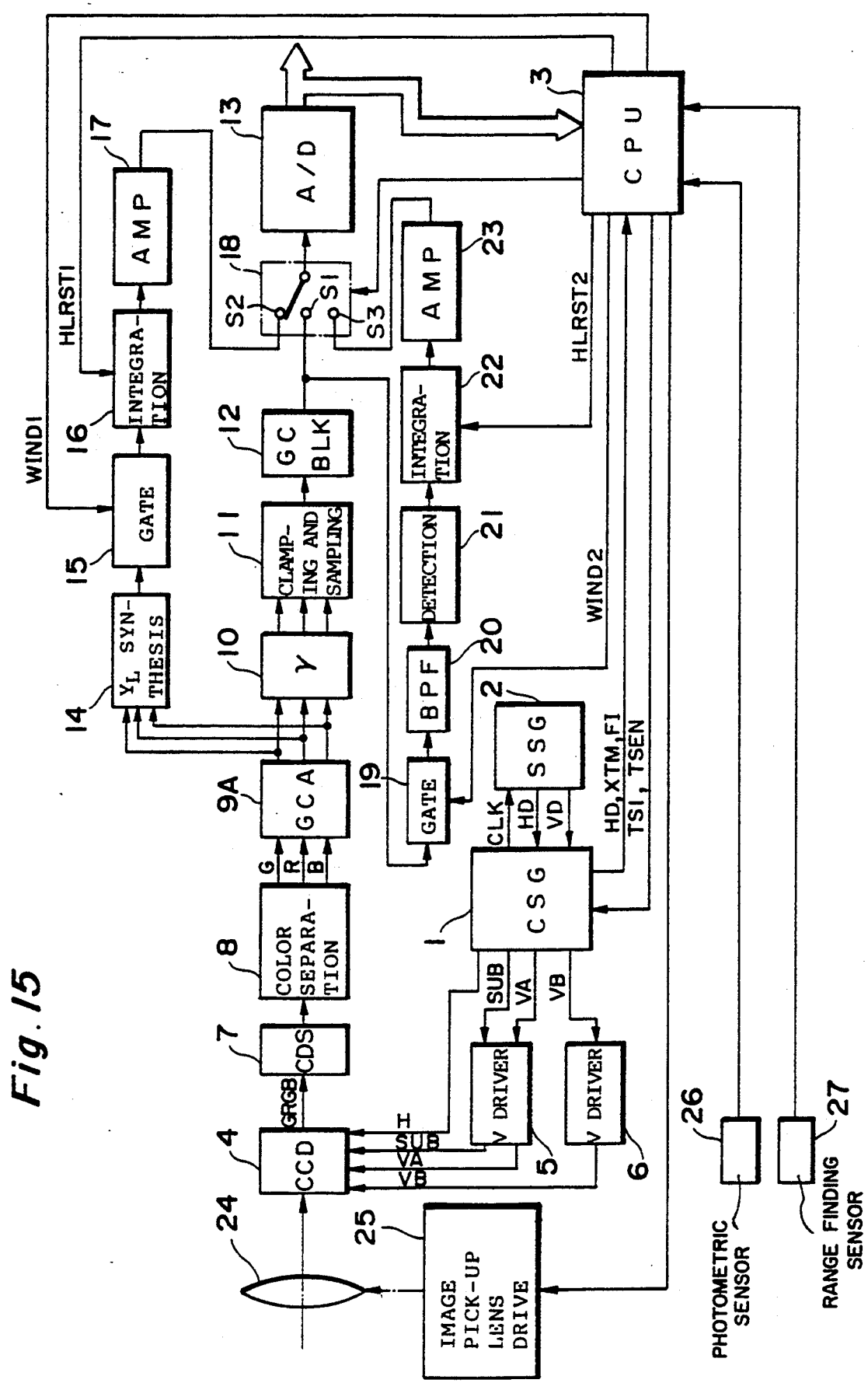
FIG. 15 is a block diagram illustrating the electrical configuration of a digital still-video camera according to a second embodiment of the present invention.

FIG. 15 is a block diagram illustrating the electrical configuration of the digital still-video camera. Elements identical with those shown in FIG. 1 are designated by like reference characters and need not be described again.

The image pick-up optical system includes an image pick-up lens 24, a diaphragm (iris) (not shown) and the CCD 4 as the solid-state electronic image sensing device (image sensor). Though a mechanical shutter is provided if necessary, in general the shutter function is implemented by an electronic shutter realized by control of the CCD 4. The image pick-up lens 24, which forms an image on the CCD 4, is moved by an image pick-up lens driving unit 25, which is controlled by the CPU 3, thereby being positioned at a position where focus is achieved.

In the second embodiment, a photometric sensor 26 for preliminary photometry and a rangefinding sensor 27 for preliminary rangefinding are provided, and the CPU 3 is provided with photometric data and rangefinding data from these sensors 26 and 27, respectively. On the basis of the photometric data obtained from the photometric sensor 26, the CPU 3 controls the f-stop value or the shutter speed, whereby the amount of exposure of the CCD 4 is made to enter a substantially appropriate range. Further, on the basis of the rangefinding data from the rangefinding sensor 27, the CPU 3 positions the image pick-up lens 24 in the vicinity of the focused position via the image pick-up lens driving unit 25.

Preliminary imaging is carried out after this rough exposure adjustment based upon preliminary photometry and rough focusing control based upon preliminary rangefinding. The video signal obtained from the CCD 4 by this preliminary imaging is utilized to perform calculation of the photometric value, accurate exposure control and accurate focusing control. This highly precise control of exposure and focusing will be described in detail later.

Drive of the CCD 4 (namely image pick-up and readout of the video signal) is performed at least at the time of photography and is for the purpose of accurate photometric processing and rangefinding processing that precede it.

The video signals of the A and B fields representing the image of the subject outputted by the CCD 4 are applied to the color separating circuit 8 through the correlated double-sampling circuit (CDS) 7. The color separating circuit 8 separates the input video signal into color signals of the three primary colors G (green), R (red) and B (blue).

Figure 16:
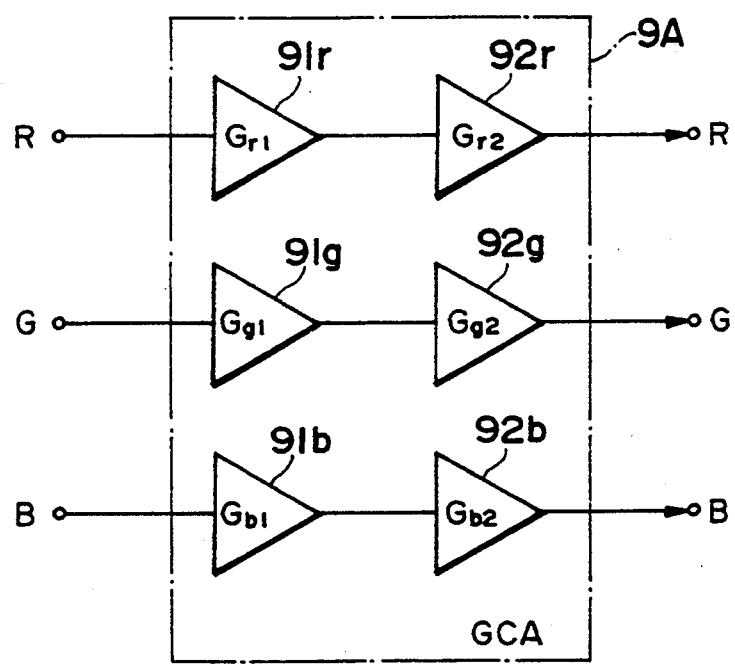
FIG. 16 is a circuit diagram illustrating a specific example of a variable-gain amplifier circuit.

The color signals G, R, B are applied to a GCA 9A, a specific example of the circuitry of which is illustrated in FIG. 16. The GCA 9A includes variable-gain amplifiers 91r, 92r, 91g, 92g and 91b, 92b provided for the R, G and B signals, respectively. The amplifiers 91r, 91g and 91b of the GCA 9A correct for a disparity in optical transmittance between colors in color filters provided in the CCD 4 (this correction shall be referred to as a "color-filter sensitivity-ratio correction" hereinafter), and the amplifiers 92r, 92g and 92b of the GCA 9A perform a white-balance adjustment. After these correcting and adjusting operations, the GCA 9A applies the output color signals R, G, B to the gamma-corrector circuit 10. This is for performing focusing control, described later, in a highly accurate manner. The details of the gamma-corrector circuit 10 will be described below. Though it suffices to perform at least the color-filter sensitivity-ratio correction for the purpose of focusing control, it is far more desirable to carry out the white-balance adjustment as well.

The output color signals R, G, B of the GCA 9A are subjected to a tone adjustment by the gamma-corrector circuit 10, after which the resulting signals enter the clamping and resampling circuit 11.

The clamping and resampling circuit 11 clamps the three color signals R, G, B and converts them back into the color-sequential signals GRGB . . . , which agree with the arrangement of the color filters in the CCD4, by resampling. The color-sequential signals enter the gain-controlled blanking circuit 12. The latter amplifies the color-sequential signals to a suitable level in order for these signals to be recorded and also applies a blanking signal to them. The output signal of the circuit 12 is then applied to a first input terminal S1 of a changeover switch 18.

Precision photometric processing (exposure control) and focusing control are carried out prior to actual photography in the manner described above. Photometric processing is performed utilizing a low-frequency component of the video signal obtained from the CCD 4 by preliminary imaging. Focusing control is performed utilizing a high-frequency component of this video signal.

In order to execute photometric processing, the $Y_L$ synthesizing circuit 14, the gate circuit 15, the integrating circuit 16 and the amplifier circuit 17 are provided for the purpose of extracting low-frequency components of the video signal representing the image within the photometric area (described later) provided inside the photographic area of the CCD 4. The output signal of the amplifier circuit 17 is applied to a second input terminal S2 of the changeover switch 18.

In order to execute focusing control, on the other hand, a gate circuit 19, a band-pass filter (hereinafter referred to as a "BPF") 20, a detector circuit 21, an integrating circuit 22 and an amplifier circuit 23 are provided for the purpose of extracting high-frequency components of the video signal representing the image within the rangefinding area (described later) provided inside the photographic area of the CCD 4. The output signal of the amplifier circuit 23 is applied to a third input terminal S3 of the changeover switch 18.

The changeover switch 18 is controlled by the CPU 3 and selectively delivers the output of the gain-controlled blanking circuit 12, the amplifier circuit 17 or the amplifier circuit 23. The output signal of the changeover switch 18 is applied to the A/D converter 13 so that this signal is converted into digital data.

In photometric control and focusing control performed prior to actual photography, the changeover switch 18 selects and outputs the input signal to the input terminal S2 or S3. As will be described later, the changeover switch 18 in principle changes over between the input terminals S2 and S3 every field. In the time period of the A field (first field) that constructs one frame, photometric processing is performed by selecting the input terminal S2. In the time period of the B field (second field), focusing control is performed by selecting the input terminal S3. The A-field image and B-field image constructing one frame may be considered to represent images of the field of view at substantially the same point in time. Therefore, the video signal of the A field and the video signal of the B field can thus be used for photometric processing and focusing control, respectively. In this photometric processing and focusing control, the output data of the A/D converter 13 is accepted by the CPU 3.

Actual photography is carried out after photometric processing, exposure control (control of the f-stop and shutter speed) based upon this processing and focusing control (positioning of the image pick-up lens 24). At this time the changeover switch 18 is changed over so as to select the input terminal S1. The video signal obtained from the CCD 4 by actual photography enters the A/D converter 13 via the circuits 7, 8, 9A, 10, 11, 12 and changeover switch 18, the video signal is converted into digital image data by the A/D converter 13, the digital data is subjected to such processing as Y/C separation and data compression by image-data processing circuitry (not shown), and then the resulting image data is recorded on a recording medium such as a memory card.

As mentioned earlier, photometric processing (and exposure control based upon this processing) and focusing control are performed prior to actual photography. The photometric processing will be described first.

The photometric processing is executed using the $Y_L$ synthesizing circuit 14, the gate circuit 15, the integrating circuit 16 and the amplifier circuit 17 in the manner described above. The output color signals R, G, B of the GCA 9A are applied to the $Y_L$ synthesizing circuit 14.

The specific electrical configuration of these circuits is the same as that shown in FIG. 2. The CPU 3 outputs a window signal WIND1 for controlling the gate circuit 15 and a reset signal HLRST1 for resetting the integrating circuit 16.

In photometric processing according to this embodiment as well, average photometry (AV photometry) for measuring average brightness within the field of view and spot photometry (SP photometry) for measuring brightness of the main subject within the field of view are performed. This is particularly useful in a case where the brightness of the main subject and the brightness of the background within the field of view differ and it is necessary to suitably set exposure conditions conforming to this difference.

Integration by the integrating circuit 16 is performed to alternate, every horizontal scanning interval, with the A/D conversion operation by the A/D converter 14 and the addition processing in this embodiment as well.

The AV photometric area and the SP photometric area set in the photographic area 30 of the CCD 4 are the same as those shown in FIG. 8.

The memory peripheral to the CPU 3 is provided with a storage area for photometry and a storage area for rangefinding. The storage area for photometry has a data storage area for AV photometry and a data storage area for SP photometry.

Figure 17:
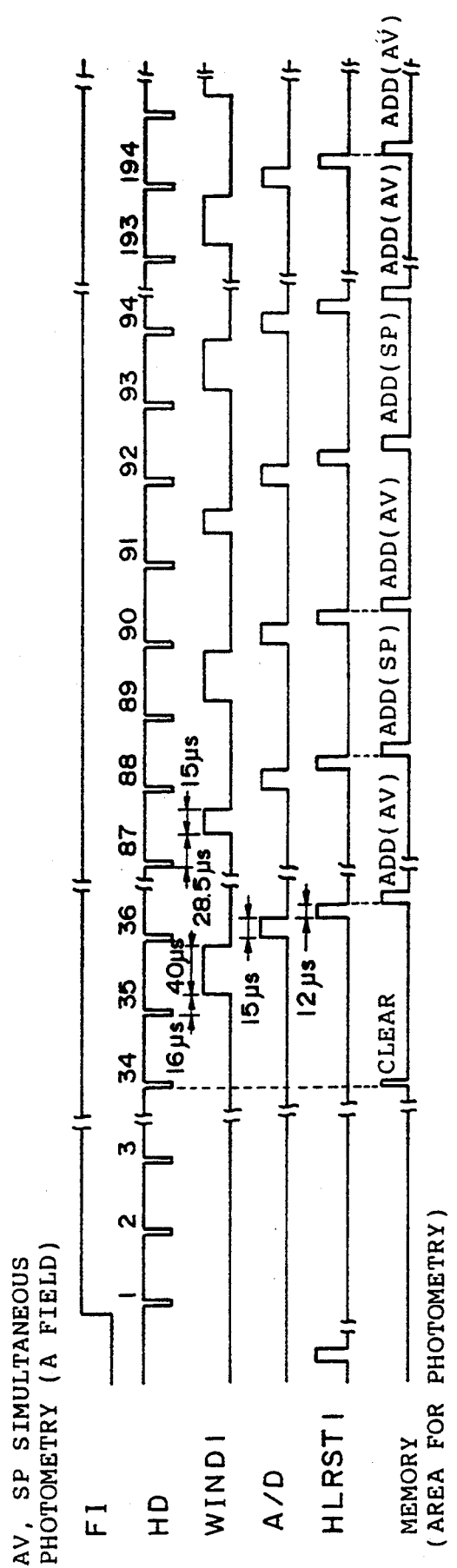
FIG. 17 is a time chart illustrating photometric processing.

FIG. 17 is a time chart, similar to that of FIG. 9, for performing AV photometry and SP photometry. The difference here is that the signals WIND, HLRST are expressed by WIND1, HLRST1.

The CPU 3 adds the integrated data regarding one horizontal scanning line, which data is obtained based upon the window signal WIND1 having the 40 μs pulse width. This addition is performed in the data area for the AV photometric area over one field interval to calculate the AV photometric value $EV_{AV}$.

Further, the CPU 3 adds the integrated data regarding one horizontal scanning line, which data is obtained based upon the window signal WIND1 having the 15 μs pulse width. This addition is performed in the data area for the SP photometric area over one field interval to calculate the SP photometric value $EV_{SP}$. This calculation is performed separately of the calculation of the AV photometric value $EV_{AV}$.

The overall operation of AV photometric processing and SP photometric processing performed by the CPU 3 is as illustrated in FIG. 6.

At the start of photometric processing, the CPU 3 performs initial setting of the exposure conditions and controls one or both of the iris and electronic shutter so that the initial exposure conditions will be realized (step 50). An initial exposure condition most likely statistically, e.g., an exposure quantity of EV=10 (an f-stop of F4 and a shutter speed of 1/60 sec or an f-stop of F2.8 and a shutter speed of 1/125 sec) may be set without performing preliminary photometry.

When the horizontal scanning interval within the AV photometric area is attained (step 51), the window signal WIND1 for the AV photometric area is outputted and the integrating circuit 16 is made to perform the integrating operation during the pulse width of this signal (step 52). After the window signal WIND1 decays, the A/D converter 13 is driven into operation to subject the integrated signal from the integrating circuit 16 to the A/D conversion so that digital integrated data will be obtained.

Next, it is determined whether the integrated data obtained resides within a prescribed range determined in advance (step 53).

In a case where the integrated data obtained is indicative of a value within the prescribed range, this integrated data is added to the value in the data area of the memory that is for the AV photometric area (step 54). If the point is still within the photometric area (NO at step S55), the program returns to step 52. In a case where the integrated data resides outside the prescribed range, the line-number counter is incremented (step 57) and processing for adding integrated data is not performed. In other words, this integrated data is not used as a photometric value. The line-number counter is for counting the number of horizontal lines over which the integrated data is outside the prescribed range. If the value registered by the line-number counter is less than a prescribed value (NO at step 58), the program returns to step 52 via step 55.

With regard to the portion of the AV photometric area not overlapped by the SP photometric area in the vertical direction, the above-described operation is repeated with two horizontal scanning intervals serving as one period. The obtained integrated data is added in the AV photometric data area.

In the portion where the AV photometric area and SP photometric area overlap each other in the vertical direction, the window signal WIND1 for AV photometry and the window signal WIND1 for SP photometry are outputted alternately and integration of the luminance signal $Y_L$, A/D conversion of the integrated signal and the determination as to whether the integrated data resides in the prescribed range are performed in a manner the same as that set forth above. The integrated data obtained by integration, for the duration of the pulse width, of the window signal WIND1 for AV photometry is added to the data area for the AV photometric area, and the integrated data obtained by integration, for the duration of the pulse width, of the window signal WIND1 for SP photometry is added to the data area for the SP photometric area. Line-number counters for counting the number of lines for which the "NO" decision is rendered at step 53 are provided for both the AV photometric area and the SP photometric area so that the numbers of lines for which the "NO" decision is rendered may be counted separately for both photometric areas. An arrangement may be adopted in which the prescribed numbers of lines for the decision at step 58 are set to have different values for the AV and SP photometric areas.

When the point departs from the range of the photometric area (YES at step 55), the AV photometric value $EV_{AV}$ for the AV photometric area and the SP photometric value $EV_{SP}$ for the SP photometric area are calculated using the values obtained by adding the integrated data, obtained thus far, regarding the AV photometric area and the SP photometric area, respectively (step 56).

On the basis of photometric values $EV_{AV}$ and $EV_{SP}$ obtained, the CPU 3 decides the exposure conditions of f-stop, shutter speed and whether or not the strobe is to be fired.

Further, in a case where the value in the line-number counter, which counts the number of horizontal lines over which the integrated data is outside the prescribed range, has exceeded a prescribed number (YES at step 58), the exposure conditions are changed (step 59) and the area of the memory for photometry is cleared, after which photometric processing from step 51 is repeated at the moment the next frame begins. The decision at step 58 may be rendered with regard solely to the AV photometric area or with regard to each of the AV and SP photometric areas.

Figure 25A:
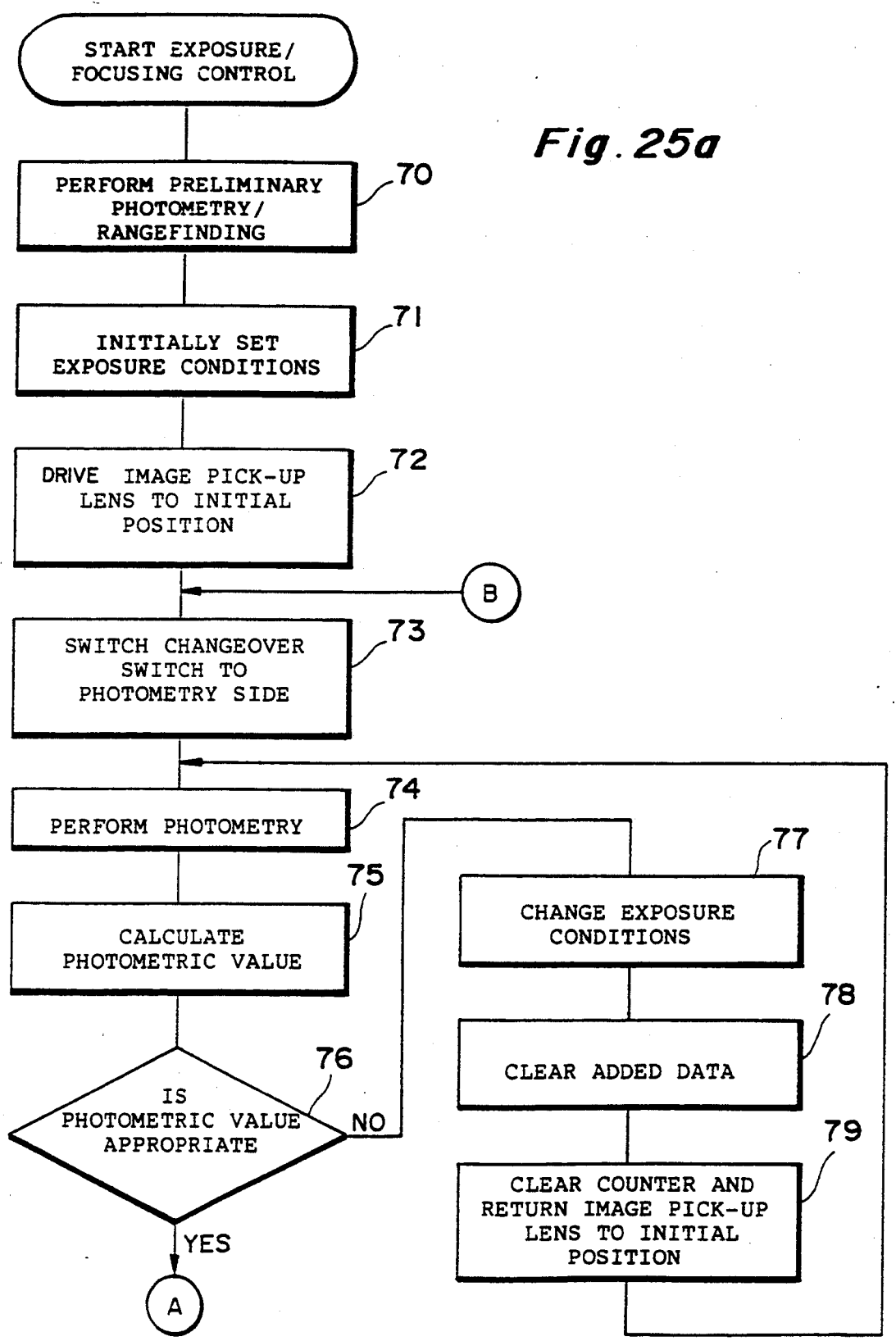
FIGS. 25a and 25b are flowcharts illustrating the procedure of processing, executed by a CPU, for exposure control and focusing control.
Figure 25B:
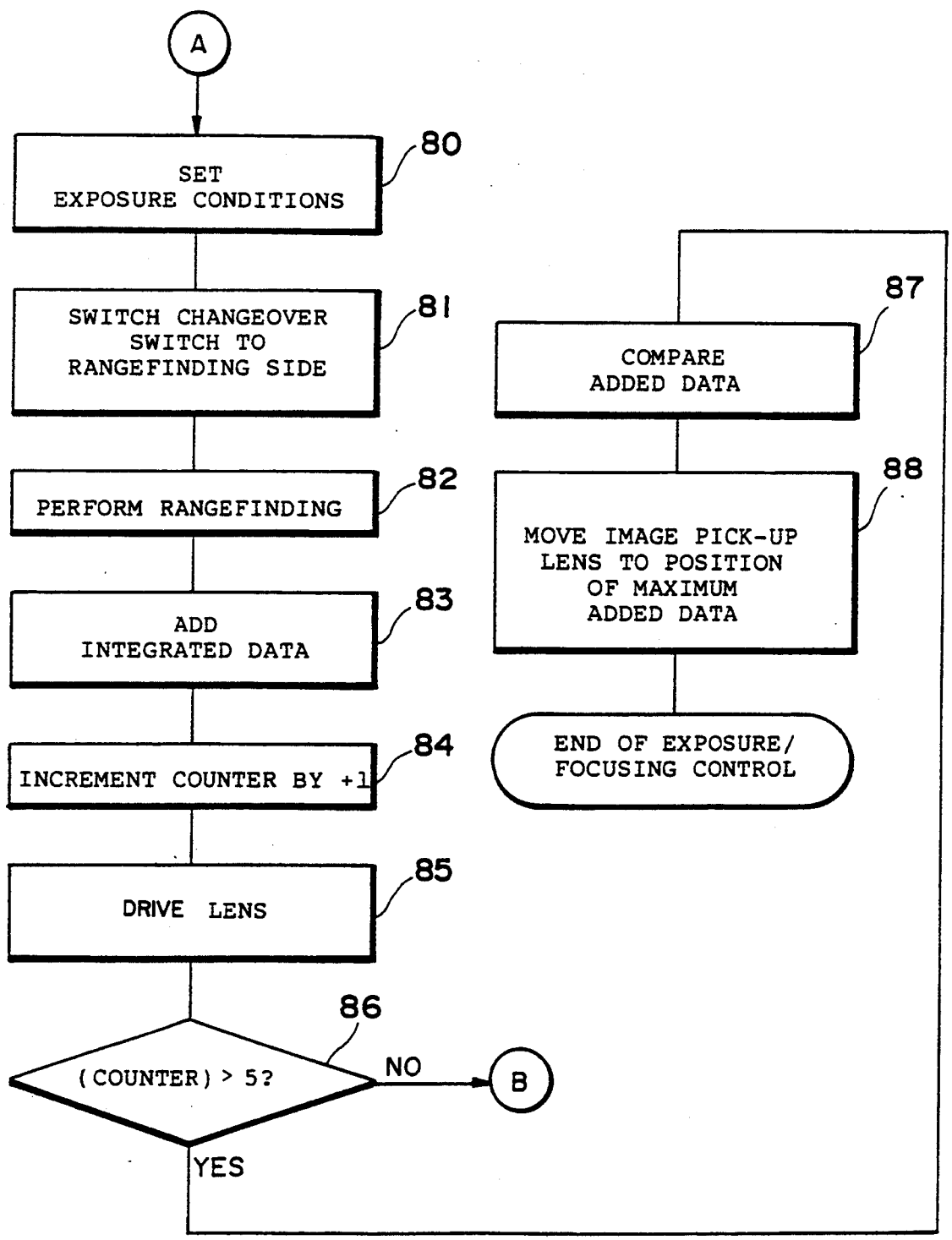

The processing for determining whether an appropriate photometric value has been obtained or not will be touched upon again in the description of FIGS. 25a and 25b.

The procedure of processing, executed by the CPU 3, for setting exposure conditions based upon the AV photometric value $EV_{AV}$ and SP photometric value $EV_{SP}$ obtained by the photometric processing set forth above is as described earlier with reference to the flowchart of FIG. 7.

Focusing control will now be described.

With reference again to FIG. 15, the output signal of the gain-controlled blanking circuit 12 enters tile gate circuit 19. The gate circuit 19 is controlled by a window signal WIND2 provided by the CPU 3. The output signal of the gain-controlled blanking circuit 12 enters the BPF (band-pass filter) 20 by being passed via the gate circuit 19 for the period of time that the window signal WIND2 is applied in the prescribed horizontal scanning interval.

The BPF 20, which extracts the high-frequency components necessary for focusing control from the input signal, applies its output signal to the detector circuit 21. The high-frequency component signal outputted by the BPF 20 is detected by the detector circuit 21, the detected component is integrated by the integrating circuit 22 and the integrated signal is amplified by the amplifier circuit 23. When the changeover switch 18 has selected the input terminal S3, the amplified signal enters the A/D converter 13, which converts the amplified signal into digital data for focusing control. This data is then accepted by the CPU 3.

The digital data provided by the A/D converter 13 is integrated data obtained by integration over the horizontal scanning interval of the rangefinding area, described below, set in the photographic area. The CPU 3 adds the integrated data over the vertical scanning interval of the rangefinding area, calculates data for rangefinding and performs focusing control based upon this data. The details will be described later.

In a case where the image is blurred because it is out of focus, generally there are few high-frequency components contained in the video signal obtained from the CCD by photography. When the image is brought into focus, the high-frequency components of the video signal increase in number. The high-frequency components contained in the video signal are maximized at the position of correct focus. In this embodiment, focusing control is carried out on the basis of this fact, and the BPF 20 is set to a pass band of about 1.5~2.5 MHz in order to extract the high-frequency components of the video signal.

Figure 18:
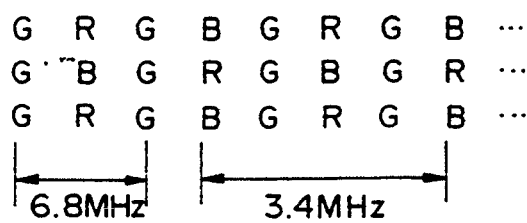
FIG. 18 is a diagram showing an array of color filters of a CCD.

The color filters provided in the CCD 4 are arrayed repeatedly at GRGB in the horizontal direction in this embodiment, as shown in FIG. 18. If the readout clock frequency of the CCD 4 is assumed to be 13.5 MHz, a component having a repetition frequency of 6.8 MHz will be contained in the video signal obtained from the light-receiving element (photodiode) provided with a green (G) filter. With regard to the colors red (R) and blue (B), components having a repetition frequency of 3.4 MHz will be contained in the video signal.

The video signal that enters the BPF 20 through the gate circuit 19 is composed of color-signal components converted, in the clamping and resampling circuit 11, into the color-filter array shown in FIG. 18. Therefore, in addition to the frequency components representing the image of the subject, the video signal contains repetition-frequency components (3.4 MHz and 6.8 MHz) ascribable to the above-mentioned color-filter array.

The repetition-frequency components ascribable to the color-filter array increase or decrease in dependence upon a disparity in the optical transmittances among the R, G, B filters, namely a disparity in the sensitivity ratio of the color filters, and in dependence upon a disruption in white balance. For example, if it is assumed that the optical transmittances of the color filters all have the same value, that perfect white balance is in effect and that a pure white subject is being photographed, there will be almost no repetition-frequency components ascribable to the color-filter array.

The GCA 9A is for correcting a fluctuation in the level of the video signal based upon a disparity in the optical transmittance of the color filters in order to eliminate, to the greatest extent possible, the repetition-frequency components due to the color-filter array, and for adjusting white balance.

More specifically, with reference again to FIG. 15, when the color-filter density-ratio correction is performed, gains $G_{r2}$, $G_{g2}$, $G_{b2}$ of the amplifiers 92r, 92g, 92b for white-balance correction are set to suitable prescribed gains (on the order of center gain, for example), gain $G_{g1}$ of the amplifier 91g is fixed, and the levels of the other color signals R, B with respect to the G signal at a certain color temperature (ordinarily on the order of 5500 K) are adjusted by changing gains $G_{r1}$, $G_{b1}$ of the amplifiers 91r, 91b. Once the adjustment has been made, the gains $G_{r1}$, $G_{g1}$, $G_{b1}$ are fixed. As is well known, white-balance adjustment is carried out by controlling at least the gains $G_{r2}$, $G_{b2}$ of the amplifiers 92r, 92b based upon the detection signals of color sensors. This is performed by raising the gain $G_{r2}$ and lowering the gain $G_{b2}$ when the color temperature rises, and lowering the gain $G_{r2}$ and raising the gain $G_{b2}$ when the color temperature declines. The gains $G_{g1}$, $G_{g2}$ of the G-signal amplifiers 91g, 92g may be fixed.

Figure 19:
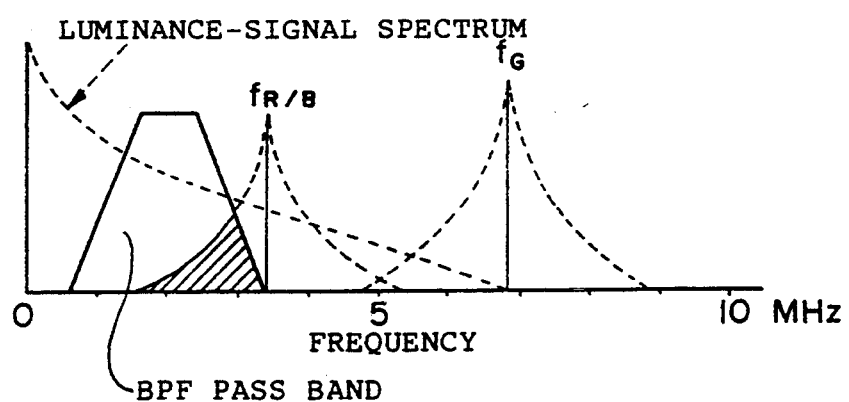
FIG. 19 is a graph illustrating the pass band of a BPF, repetition frequencies arising from the array of color filters and a spectrum of a luminance signal contained in a video signal in a case where correction of color-filter sensitivity ratio and white-balance correction are not performed.
Figure 20:
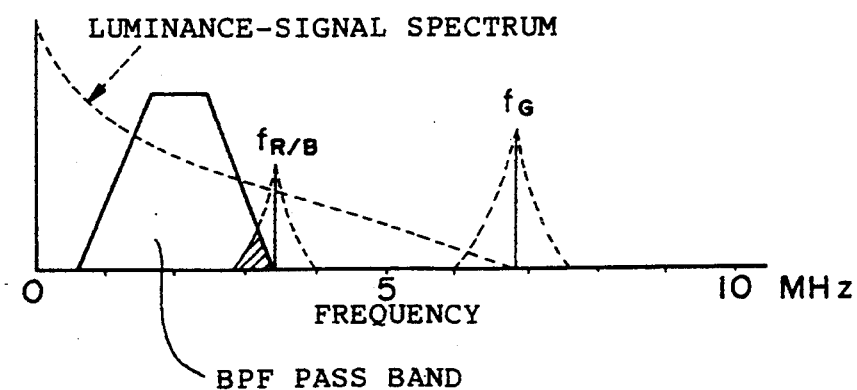
FIG. 20 is a graph illustrating the pass band of a BPF, repetition frequency arising from the array of color filters and a spectrum of a luminance signal contained in a video signal in a case where correction of color-filter sensitivity ratio and white-balance correction are performed.

FIGS. 19 and 20 are graphs illustrating the pass band of the BPF 20, the repetition-frequency components (center frequency $f_G = 6.8$ MHz) arising from the array of color filters for G, the repetition-frequency components (center frequency $f_{R/B} = 3.4$ MHz) arising from the array of color filters for R or B and a spectrum of a luminance signal contained in a video signal representing the image of the subject.

FIG. 19 illustrates a case in which the color-filter sensitivity-ratio correction and white-balance correction are not performed. The part (indicated by hatching) of the repetition-frequency components arising from the array of color filters, especially the array of color filters for R and B, falls within the pass band of the BPF 20. In this case, therefore, the video signal passed by the BPF 20 will contain a considerable amount of repetition-frequency components stemming from the color-filter array.

FIG. 20 illustrates a case in which both the color-filter sensitivity-ratio correction and white-balance correction are performed. The repetition-frequency components, which arise from the array of color filters, falling within the pass band of the BPF 20 are much reduced. In this case, therefore, almost the entirety of the video signal passed by the BPF 20 may be considered to represent the image of the subject. This makes it possible to achieve excellent focusing processing not impeded by the repetition-frequency components ascribable to the array of color filters.

The minimum function of the GCA 9A is to perform the color-filter sensitivity-ratio correction, whereby disruption caused by the repetition-frequency components ascribable to the array of color filters is considerably reduced. Preferably, the GCA 9A implements both the color-filter sensitivity-ratio correction and the white-balance correction. This will assure even better focusing control.

Figure 21:
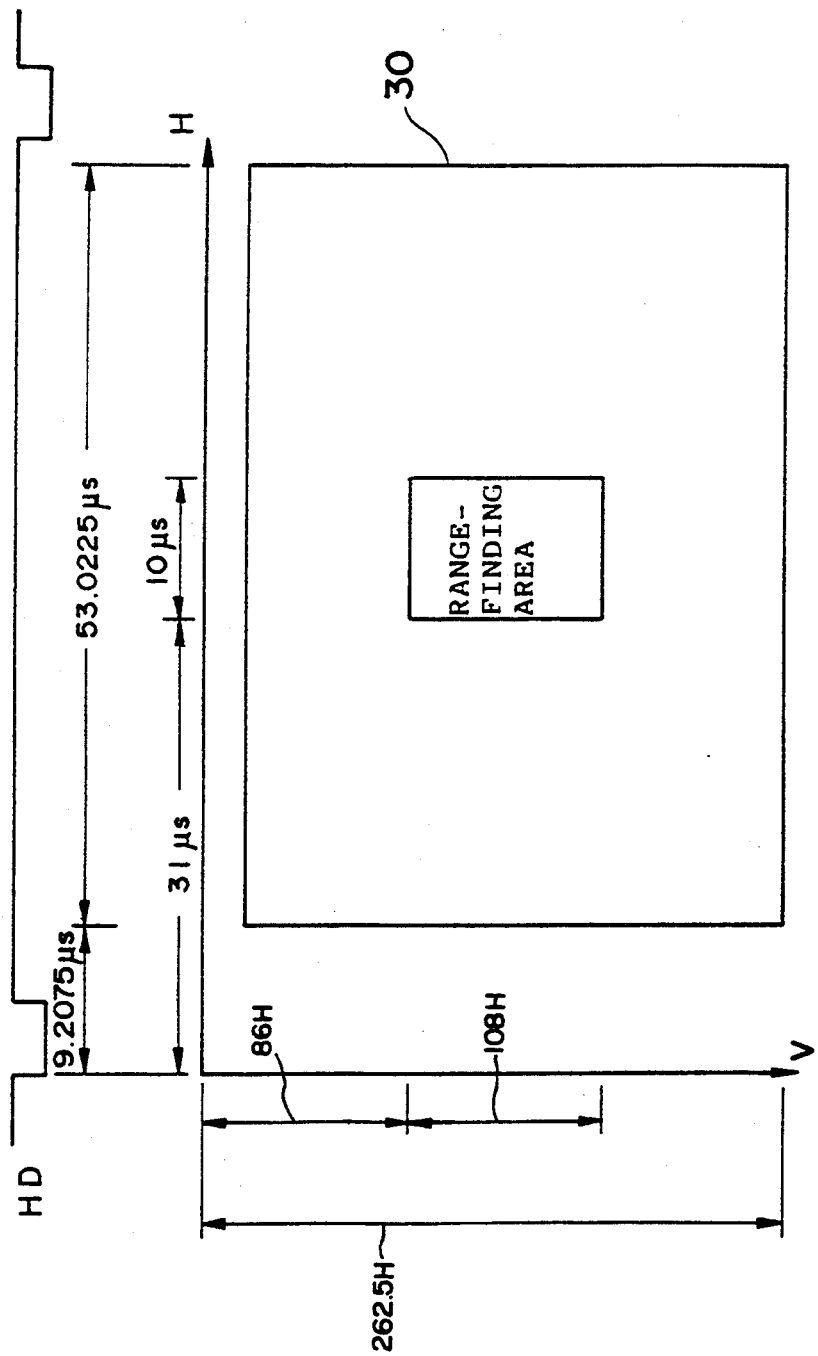
FIG. 21 is a diagram showing a rangefinding area set within a photographic area.

FIG. 21 is a diagram showing a rangefinding area set within the photographic area 30. The rangefinding area is set at the central portion of the photographic area 30, where a main subject is most likely to be present. In this embodiment, the rangefinding area is set as an area smaller than the SP photometric area illustrated in FIG.

8 in the horizontal direction. It goes without saying that the rangefinding area is capable of being set to have any width at any location in the photographic area 30.

Figure 22:
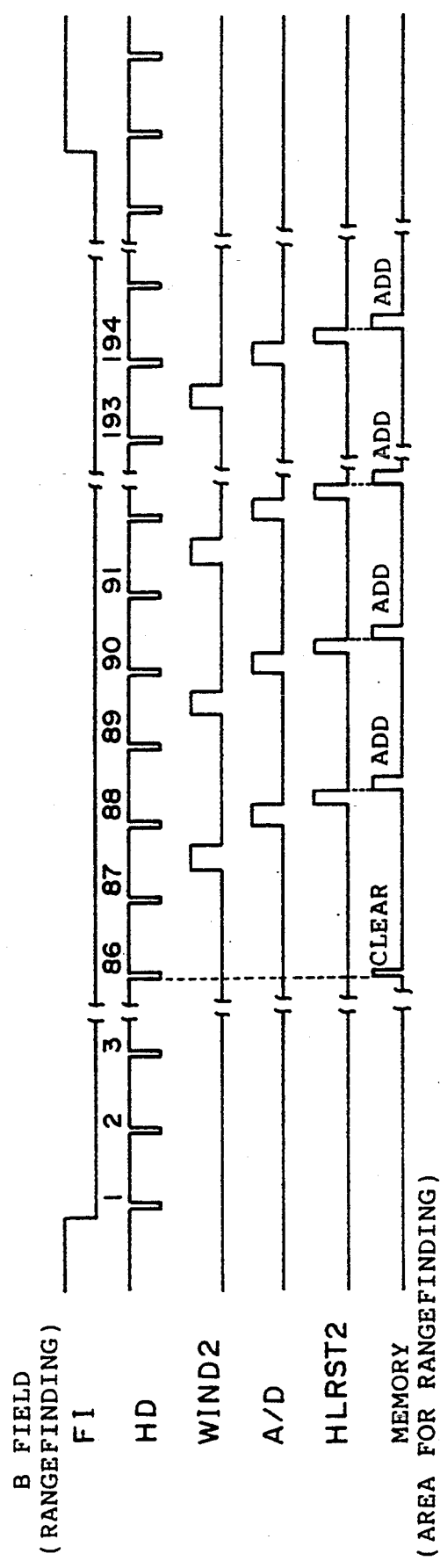
FIG. 22 is a time chart illustrating rangefinding processing.

In the time period of the B field, as illustrated in FIG. 22, a window signal WIND2, which has a pulse width of 10 μs, is applied to the gate circuit 19 31 μs after the trailing edge of the 87th horizontal synchronizing signal HD. During the time that the window signal WIND2 is being applied, the gate circuit 19 passes the output signal of the circuit 12, as described earlier. The high-frequency component signal extracted by the BPF 20 is fed to the integrating circuit 22 via the detector circuit 21 to be integrated. The integrated signal outputted from the integrating circuit 22 is acted upon by the amplifier circuit 23 and changeover switch 18 and is then converted into digital data by the A/D converter 13 in the next horizontal scanning interval to be accepted by the CPU3. The integrating circuit 22 is reset by a reset signal HLRST2 after the A/D conversion processing. The CPU 3 adds this digital data to the previous data (which will be zero in the case of the first operation owing to clearing) in the rangefinding area of the memory and stores the sum in this area. The rangefinding area of the memory is cleared in synchronism with the 86th horizontal synchronizing signal HD or at the beginning of the B field.

Thus, as set forth above, the detection of the high-frequency component signal by the BPF 20 along one horizontal scanning line in the rangefinding area and the detection and integration of this high-frequency component signal, and the A/D conversion of the integrated signal and addition of the integrated data in the horizontal scanning interval are repeatedly performed alternately every horizontal scanning interval. The repetition of these operations is performed up to the 194th horizontal scanning interval, namely over the entirety of the rangefinding area.

Accordingly, at the moment scanning in the rangefinding area ends, the added data for rangefinding representing the integrated values, over the entirety of the rangefinding area, of the high-frequency signals passed by the BPF 20 will have been stored in the rangefinding area of the memory.

In preliminary rangefinding using the rangefinding sensor 27, as mentioned above, the approximate distance to the subject is measured. On the basis of the preliminary rangefinding data, the image pick-up lens 24 is driven to a position (referred to as the "initial position") slightly backward of a position considered to be that for correct focus.

The integrating operation, over the rangefinding area, of the high-frequency components in the video signal outputted by the CCD 4 is carried out at least six times (i.e., in the B-field interval of each frame interval over six frame intervals) while the image pick-up lens 24 is fed forward 10 μm at a time. First added data for rangefinding is obtained first at the aforesaid initial position (where the driven amount of the image pick-up lens 24 is 0 μm). In the next frame interval, second added data for rangefinding is obtained at a position (where the driven amount of the image pick-up lens 24 is 10 μm) obtained by feeding the image pick-up lens 24 10 μm from the initial position. Third to sixth items of added data for rangefinding are similarly obtained while driving the image pick-up lens 24 10 μm at a time. The six items of added data thus obtained are stored in a prescribed area of the memory, as illustrated in FIG. 23.

Figure 24:
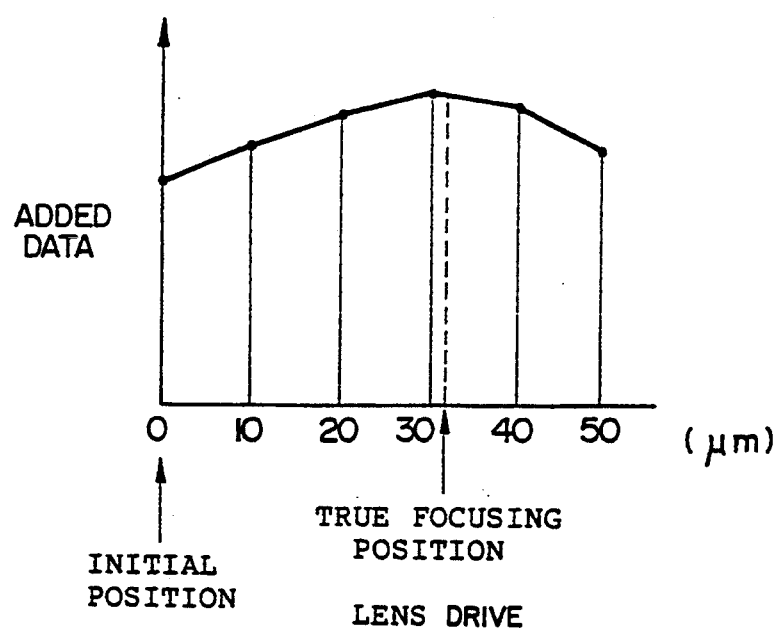
FIG. 24 is a graph showing addition data for range-finding, this data being used for the purpose of focusing.

FIG. 24 is a graphical representation of the added data for rangefinding at the six positions shown in FIG. 23. The initial position of the image pick-up lens 24 is slightly backward of the true focused position. The image pick-up lens 24 is driven from this position 10 μm at a time to obtain the added data for rangefinding at each position. The integrated value of the high-frequency signal contained in the video signal becomes maximum at the true focused position. Since the unit driven amount of the image pick-up lens 24 is 10 μm, which is a very minute distance, the error will be extremely small even if the position at which the added data for rangefinding indicates the maximum value is regarded as the true focused position. Accordingly, highly precise focusing can be achieved by positioning the image pick-up lens 24 at the position at which the added data for rangefinding indicates the maximum value.

The photometric processing and the processing for collecting the added data for rangefinding for the purpose of focusing control described above is carried out alternately every field. However, the added data for rangefinding obtained prior to the setting of exposure conditions is invalidated and only added data for rangefinding obtained after the setting of exposure conditions is accepted as being valid. The reason for this is that since the value of the added data for rangefinding obtained differs depending upon the exposure conditions, accurate added data for rangefinding cannot be obtained in a state in which the exposure conditions have been set improperly.

FIG. 25 illustrates the overall procedure of processing for exposure control and focusing control based upon preliminary photometry and preliminary rangefinding processing as well as preliminary imaging performed thereafter.

First, the CPU 3 performs preliminary photometry based upon the photometric signal from the photometric sensor 26 and preliminary rangefinding based upon the rangefinding signal from the rangefinding sensor 27 (step 70). Initial setting of the exposure conditions is performed based upon the preliminary photometry (step 71), and the image pick-up lens 24 is driven to the initial position based upon the preliminary rangefinding (step 72).

Next, the changeover switch 18 is connected to the input terminal S2 (step 73). As a result, photometry and calculation of a photometric value are performed through the procedure of FIG. 6 in the A-field interval (steps 74, 75). This corresponds to the processing of steps 51~56 in FIG. 6.

It is determined whether the photometric value thus found is appropriate (step 76). This determination includes the determination of step 58 in FIG. 6. Preferably, in addition to the determination of step 58, it is determined whether the photometric value falls within a range corresponding to the exposure conditions set at step 71.

In a case where the obtained photometric value is judged to be suitable, the exposure conditions (f-stop and shutter speed) are set based upon the photometric value so that the f-stop of the diaphragm and the shutter speed are set in such a manner that these exposure conditions are obtained (step 80). This corresponds to the processing illustrated in FIG. 7.

Next, the changeover switch 18 is changed over to the side of input terminal S3 (step 81). When readout of the video signal of the B field starts, the integration of the video signal along the horizontal scanning lines in the rangefinding interval, the A/D conversion of the integrated signal and the addition of the A/D-converted integrated data are performed over the entirety of the rangefinding area (steps 82, 83), as described above.

The added data for rangefinding is collected while the image pick-up lens 24 is driven 10 μm at a time every frame (B field). A counter is provided in order to count the number of times the image pick-up lens 24 is driven.

When the added data is obtained with regard to the rangefinding area, the counter is incremented (step 84) and the image pick-up lens 24 is driven 10 μm (step 85). The added data obtained is stored in the memory areas shown in FIG. 23.

The processing of steps 73~76 and 80~85 is repeated frame by frame. When the value in the counter exceeds 5 (step 86), the added data for rangefinding obtained by the six operations and stored in the areas shown in FIG. 23 are compared with one another to find the maximum value (step 87). The image pick-up lens 24 is shifted to the position corresponding to the largest item of added data for rangefinding and the lens is positioned at this location. In the case of the example illustrated in FIG. 24, the image pick-up lens 24 is positioned at a point obtained by driving the lens 30 μm from the initial position.

When photometry and rangefinding are thus concluded to carry out the setting of exposure conditions and focusing, the changeover switch 18 is changed over to the input terminal S1 and a transition is made to actual photography.

When it is determined at step 76 that the photometric value resides in an inappropriate range, the exposure conditions are changed (step 77). This corresponds to step 59 in FIG. 6. If the photometric value is a large value, the amount of exposure is made small. Conversely, if the photometric value is a small value, the amount of exposure is enlarged.

All of the added data for rangefinding obtained thus far and stored in the memory areas shown in FIG. 23 is cleared (step 78), the counter is cleared and the image pick-up lens 24 is returned to the initial position (step 79). This is done so that the added data for rangefinding obtained in a state in which appropriate exposure conditions have not been set will not be used in focusing control. The program subsequently returns to step 74 so that photometry is performed again in synchronism with the scanning of the A field.

Photometry and rangefinding are performed alternately field by field in the manner described above. The reason for performing photometric processing concurrently while rangefinding processing is being executed is that if the exposure conditions change during the course of rangefinding processing owing, say, to movement of or a change in the subject, zooming in or zooming out or sudden brightening due to sunshine, this expedient will clear the added data stored thus far, as well as the counter, at steps 78, 79, and rangefinding will be performed anew.

In the second embodiment described above, the GCA 9A corrects for the disparity in optical transmittance exhibited by the color filters provided in the CCD 4. If use is made of a CCD provided with so-called compensated filters, which are color filters in which there is no disparity in transmittance from one color filter to another, the correction for this disparity performed by the GCA will be unnecessary. In such case the GCA 9A need perform only the white-balance adjustment, as in the manner of the GCA 9 in the first embodiment.

As many apparently widely different embodiments of the present invention can be made without departing from the spirit and scope thereof, it is to be understood that the invention is not limited to the specific embodiments thereof except as defined in the appended claims.

What is claimed is:

1. A video camera having an image pick-up optical system which includes a solid-state electronic image sensing device for outputting at least two fields of a video signal with regard to one frame by interlaced scanning, comprising:

photometric-area setting means for setting photometric areas, which differ for every field in one frame, within a photographic area of the solid-state electronic image sensing device;

luminance-signal extracting means for extracting a luminance-signal component from the video signal output by the solid-state electronic image sensing device;

integrating means for integrating the luminance-signal component, which has been extracted by said luminance-signal extracting means, over an integration interval designated by an integration control signal to obtain an integrated value and for outputting a signal representing the integrated value;

integration control means for generating the integration control signal that designates the integration interval based on a horizontal scanning interval and a vertical scanning interval, which correspond to the photometric areas, such that integration is performed by said integrating means over the photometric area set for every field by said photometric-area setting means, and for applying the integration control signal to said integrating means; and photometric-value calculating means for adding the integrated values, which are output by said integrating means, field by field over the photometric area in which the integration has been performed within the vertical scanning interval, and for calculating a photometric value for every field in accordance with the added integrated values.

2. The video camera according to claim 1, wherein the photometric areas set by said photometric-area setting means comprise a first photometric area over substantially the entirety of the photographic area and a second photometric area contained in the first photometric area and smaller than the first photometric area.

3. The video camera according to claim 1, wherein the photometric areas set by said photometric-area setting means comprise areas that do not overlap one another within the photographic area.

4. A video camera having an image pick-up optical system which includes a solid-state electronic image sensing device for converting an incident light image into a video signal and outputting the video signal, comprising:

photometric-interval setting means for setting photometric intervals of at least two different types in a prescribed number of horizontal scanning lines;

luminance-signal extracting means for extracting a luminance-signal component from the video signal output by the solid-state electronic image sensing device;

integrating means for integrating the luminance-signal component, which has been extracted by said luminance-signal extracting means, over an integration interval designated by an integration control signal, to obtain an integrated value and for outputting a signal representing the integrated value;

integration control means for generating the integration control signal that designates the set photometric intervals as integration intervals in a horizontal scanning interval of horizontal scanning lines for which the photometric intervals have been set and for applying the integration control signal to said integrating means; and photometric-value calculating means for adding, for each type of photometric interval in a vertical scanning interval, the integrated values of photometric intervals of the same type which are output from said integrating means, and for calculating a photometric value for each type of photometric interval in accordance with respective added integrated values.

5. A photometric method for a video camera comprising the steps of:

setting photometric areas, which differ for every field in one frame of a video signal, within a photographic area of a solid-state electronic image sensing device;

setting an integration interval based on a horizontal scanning interval and a vertical scanning interval corresponding to the photometric areas;

extracting a luminance-signal component from the video signal output by the solid-state electronic image sensing device and integrating the extracted luminance-signal component over the integration intervals of the horizontal scanning direction and the vertical scanning direction to obtain integration signals;

adding the integrated values represented by the integration signals, which have been obtained by said integration, field by field over the photometric area in which the integration has been performed within the vertical scanning interval, and obtaining a photometric signal representing a photometric value for every field from a value resulting from the addition; and adjusting an exposure amount of the video camera based upon the photometric value represented by the photometric signal.

6. The photometric method according to claim 5, wherein the set photometric areas comprise a first photometric area over substantially the entirety of the photographic area and a second photometric area contained in the first photometric area, which includes a central portion of the photographic area and is smaller than the first photometric area.

7. The photometric method according to claim 5, wherein the set photometric areas comprise areas that do not overlap one another within the photographic area.

8. A photometric method for a video camera comprising the steps of:

setting photometric intervals of at least two different types in a prescribed number of horizontal scanning lines;

setting the set photometric intervals as integration intervals in a horizontal scanning interval of horizontal scanning lines for which the photometric intervals have been set;

extracting a luminance-signal component from the video signal output by a solid-state electronic image sensing device and integrating the extracted luminance-signal component over the integration intervals to obtain integration signal;

adding, for each type of photometric interval in a vertical scanning interval, the integrated values of photometric intervals of the same type represented by the integration signals obtained by said integration, and obtaining a photometric signal representing a photometric value for each type of photometric interval in accordance with respective added integration values represented by the integration signals; and adjusting an exposure amount of the video camera based upon the photometric value represented by the photometric signals.

9. A video camera equipped with an image pick-up optical system which includes an image pick-up lens and a solid-state electronic image sensing device having color filters for converting a light image, which is incident through the image pick-up lens, into a video signal and outputting the video signal, comprising:

a color separating circuit for separating the video signal output by the solid-state electronic image sensing device into color components and outputting color signals of the three primary colors which represent the color components;

an amplifier circuit for correcting a disparity in level of the color signals output from said color separating circuit, the disparity being caused by a difference in optical transmittances of the color filters of the solid-state electronic image sensing device;

a resampling circuit for resampling the corrected color signals output from said amplifier circuit and converting the corrected color signals into color-sequential signals corresponding to an array of the color filters of the solid-state electronic image sensing device;

high-frequency component extracting means for extracting high frequency components for rangefinding from the color-sequential signals output by said resampling circuit; and focusing control means for performing focusing control of the image pick-up lens based on the high-frequency components of the color-sequential signals extracted by said high-frequency component extracting means.

10. The video camera according to claim 9, wherein said amplifier circuit further performs white-balance adjustment of the color signals.

11. The video camera according to claim 9, further comprising:

a rangefinding sensor for performing preliminary rangefinding to obtain rangefinding data; and initial positioning means for positioning the image pick-up lens at an initial position based upon the rangefinding data obtained by said rangefinding sensor.

12. The video camera according to claim 11, further comprising control means for performing control such that said high-frequency component extracting means extracts the high-frequency components from the color-sequential signals which correspond to a rangefinding area predetermined in a photographic area and such that extraction of the high-frequency components is performed over a plurality of fields while the image pick-up lens is moved a prescribed distance at a time in one direction, said initial positioning means positioning the image pick-up lens at a position offset from a focusing position in a direction opposite to said one direction, said focusing control means calculating an integrated value, in the rangefinding area, of the high-frequency components extracted by said high-frequency component extracting means, and positioning the image pick-up lens at a position corresponding to a maximum value of calculated integrated values over the plurality of fields.

13. A focusing control method comprising the steps of:

preliminarily imaging a light image, which is incident through an image pick-up lens, with a solid-state electronic image sensing device having color filters;

separating a video signal obtained by the solid-state electronic image sensing device during said step of preliminarily imaging into color signals of the three primary colors;

correcting for a disparity in level of the color signals caused by a difference in optical transmittances of the color filters of the solid-state electronic image sensing device;

resampling the color signals corrected for disparity in level and converting the corrected color signals into color-sequential signals corresponding to an array of the color filters of the solid-state electronic image sensing device;

extracting high-frequency components for rangefinding from the color-sequential signals; and performing focusing control of the image pick-up lens based upon the high-frequency components extracted from the color-sequential signals.

14. The focusing control method according to claim 13, further comprising a step of performing white-balance correction of the color signals of the three primary colors that have been separated from the video signal.

15. The focusing control method according to claim 13, further comprising the steps of:

performing preliminary rangefinding using a rangefinding sensor to obtain rangefinding data;

initially positioning the image pick-up lens at a position offset from a focusing position in one direction based upon the rangefinding data obtained by the preliminary rangefinding;

extracting the high-frequency components over a plurality of fields while moving the image pickup lens a prescribed distance at a time in a direction opposite to said one direction;

integrating the high-frequency components extracted in each field; and positioning the image pick-up lens at a position corresponding to a maximum value of the integrated values.

16. The method according to claim 15, wherein the high-frequency components are extracted from the color-sequential signals, which correspond to a predetermined rangefinding area predetermined in a photographic area.

17. A video camera equipped with an image pick-up optical system which includes a solid-state electronic image sensing device for outputting two fields of a video signal with regard to one frame by interlaced scanning and an image pick-up lens for forming an image of a subject on the solid-state electronic image sensing device, comprising:

photometric means for integrating a luminance-signal component, which is extracted from the video signal output by the solid-state electronic image sensing device, over a prescribed photometric area set within a photographic area of the solid-state electronic image sensing device, thereby obtaining a photometric value for setting exposure conditions;

exposure control means for adjusting an amount of exposure based upon the photometric value obtained by said photometric means;

focusing control means for obtaining an integrated value for focusing control by integrating high-frequency components which are extracted from the video signal output by the solid-state electronic image sensing device for rangefinding, over a prescribed rangefinding area set within the photographic area of the solid-state electronic image sensing device, and for adjusting a focusing position of the image pick-up lens based upon the integrated value;

changeover means for alternately switching between said photometric means and said focusing control means in such a manner that said photometric means performs integration of the luminance-signal component over the photometric area with regard to one field of the two fields of the video signal which form the one frame and said focusing control means performs integration of the high-frequency components over the rangefinding area with regard to the other field of the two fields of the video signal which form the one frame; and control means for controlling said focusing control means such that said focusing control means performs integration of the high-frequency components and adjustment of the focusing position on the condition that the amount of exposure has been adjusted by said exposure control means.

18. The video camera according to claim 17, wherein when exposure conditions have been changed by said exposure control means during integration of the high-frequency components by said focusing control means, said control means clears an integrated value already obtained and controls said focusing control means in such a manner that integration of the high-frequency components is started anew.

19. The video camera according to claim 17, further comprising:

a rangefinding sensor for performing preliminary rangefinding to obtain rangefinding data; and initial positioning means for positioning the image pick-up lens at an initial position, which is offset from a focused position in one direction, based upon the rangefinding data obtained from said rangefinding sensor, said control means controlling said focusing control means to perform integration of the high-frequency components field by field over a plurality of fields while the image pick-up lens is moved a prescribed distance at a time in a direction opposite to said one direction, said focusing control means positioning the image pickup lens at a position corresponding to a maximum value of the integrated values over the plurality of fields.

20. A method of photometry and detection of focusing position in a video camera comprising the steps of:
preliminarily imaging an image of a subject, which is represented by a light image incident through an image pick-up lens, with a solid-state electronic image sensing device and reading out, from the solid-state electronic image sensing device, two fields of a video signal with regard to one frame by interlaced scanning;
obtaining a photometric value for setting exposure conditions by extracting a luminance-signal component from one field of the two fields of the video signal and integrating the luminance-signal component over a prescribed photometric area set within a photographic area of the solid-state electronic image sensing device;
adjusting an amount of exposure based upon the photometric value; and
obtaining, after adjustment of the amount of exposure, an integrated value for focusing by extracting high-frequency components from the other field of the two fields of the video signal for rangefinding and integrating the high-frequency components over a prescribed rangefinding area set within the photographic area of the solid-state electronic image sensing device, and adjusting the focusing position of the image pick-up lens based upon the integrated value.

21. The method of photometry and detection of focusing position according to claim 20, wherein when the amount of exposure has changed during integration of the high-frequency components, integration of the high-frequency components and adjusting of the focusing position of the image pick-up lens are performed anew thereafter.

22. The method of photometry and detection of focusing position according to claim 20, further comprising the steps of:
performing preliminary rangefinding using a rangefinding sensor to obtain rangefinding data;
initially positioning the image pick-up lens at a position offset from a focused position in one direction based upon the rangefinding data obtained by the preliminary rangefinding;
integrating the high-frequency components field by field over a plurality of fields while the image pick-up lens is moved at a prescribed distance at a time in a direction opposite to said one direction; and
positioning the image pick-up lens at a position corresponding to a maximum value of integrated values obtained over the plurality of fields.

* * * * *